(12) United States Patent
Kumetani

(10) Patent No.: US 11,039,188 B2
(45) Date of Patent: Jun. 15, 2021

(54) CONTENT DISTRIBUTION SYSTEM AND CONTENT DISTRIBUTION APPARATUS

(71) Applicant: SHARP KABUSHIKI KAISHA, Osaka (JP)

(72) Inventor: Kohji Kumetani, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 82 days.

(21) Appl. No.: 16/179,822

(22) Filed: Nov. 2, 2018

(65) Prior Publication Data

US 2019/0141376 A1    May 9, 2019

(30) Foreign Application Priority Data

Nov. 6, 2017  (JP) .............................. JP2017-214240

(51) Int. Cl.

| H04N 7/18 | (2006.01) |
|---|---|
| H04N 21/24 | (2011.01) |
| H04N 21/262 | (2011.01) |
| H04N 21/258 | (2011.01) |

(52) U.S. Cl.
CPC ... *H04N 21/2407* (2013.01); *H04N 21/25816* (2013.01); *H04N 21/26208* (2013.01)

(58) Field of Classification Search
CPC ............. H04N 21/4825; H04N 21/441; H04N 21/458; H04N 21/482; H04N 21/632; H04N 21/6402; H04N 21/242

See application file for complete search history.

(56) References Cited

U.S. PATENT DOCUMENTS

| 2004/0165006 A1* | 8/2004 | Kirby ................. H04N 21/4758 715/740 |
| 2004/0240451 A1* | 12/2004 | Lee ...................... H04L 12/2803 370/395.5 |
| 2008/0177822 A1* | 7/2008 | Yoneda ............ H04N 21/64322 709/202 |
| 2009/0089824 A1* | 4/2009 | Beyabani ........... H04N 7/17318 725/17 |
| 2009/0327241 A1* | 12/2009 | Douillet ................. G06F 16/44 |

(Continued)

FOREIGN PATENT DOCUMENTS

| JP | 2007-018294 A | 1/2007 |
| JP | 2014-059706 A | 4/2014 |

*Primary Examiner* — Jason Salce
(74) *Attorney, Agent, or Firm* — ScienBiziP, P.C.

(57) ABSTRACT

Provided is a content distribution system in which content is distributed from a content distribution apparatus to a plurality of display apparatuses, in which the content distribution apparatus stores the content, acquires information on a connection request source, as connection information on the display apparatus, when a connection request from each of the plurality of display apparatuses is present, groups display apparatuses to which the same content is to be distributed, into one group, among the plurality of display apparatuses, manages one display apparatus, which belongs to the group, as a master display apparatus, and the other display apparatuses as slave display apparatuses, and transmits the content and connection information on the slave display apparatus that belongs to the group, to the master display apparatus. The master display apparatus distributes the content to the slave display apparatus based on the connection information.

11 Claims, 26 Drawing Sheets

(56) References Cited

U.S. PATENT DOCUMENTS

| | | | |
|---|---|---|---|
| 2010/0228632 A1* | 9/2010 | Rodriguez | G06F 3/0425 |
| | | | 705/14.66 |
| 2013/0082827 A1* | 4/2013 | Cho | H04L 12/282 |
| | | | 340/12.52 |
| 2019/0141101 A1* | 5/2019 | Kumetani | H04L 65/4084 |

* cited by examiner

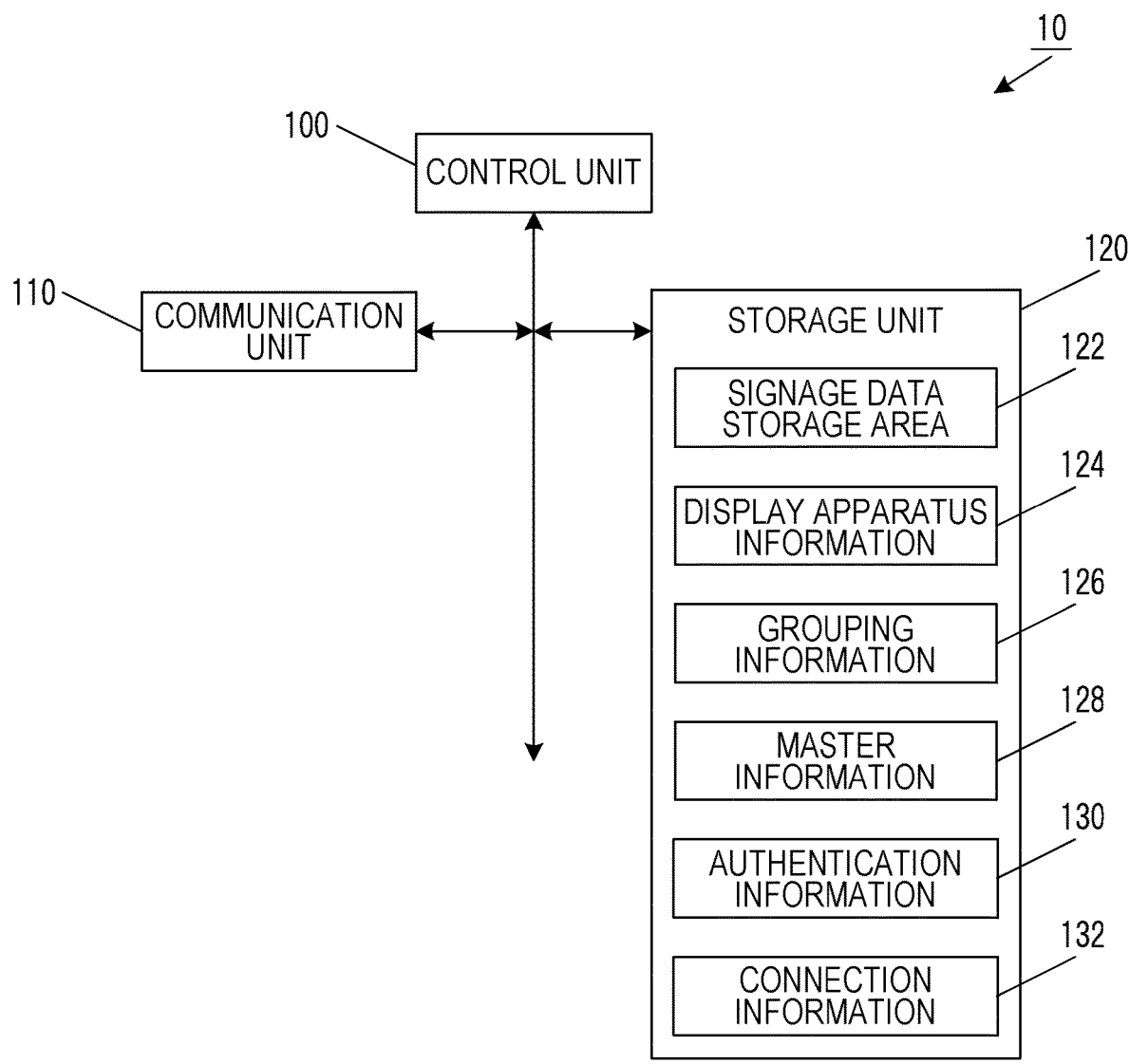

FIG. 3A

| DISPLAY APPARATUS NAME | IP ADDRESS | PORT NUMBER | PASSWORD | ATTRIBUTE | |
|---|---|---|---|---|---|
| | | | | ATTRIBUTE 1 | ATTRIBUTE 2 |
| SCREEN0001 | AAA. BBB. CCC. 101 | 9999 | SC0001abc | OSAKA | OSAKA 1 |
| SCREEN0002 | AAA. BBB. CCC. 102 | 9998 | SC0002abc | OSAKA | OSAKA 2 |
| SCREEN0003 | AAA. BBB. CCC. 103 | 9998 | SC0003abc | OSAKA | OSAKA 3 |
| ⋮ | ⋮ | ⋮ | ⋮ | ⋮ | ⋮ |

FIG. 3B

| GROUP ID | SIGNAGE DATA | DISPLAY APPARATUS NAME |
|---|---|---|
| GRP1 | data1 | SCREEN0001, SCREEN0002, ⋯, SCREEN0100 |
| GRP2 | data2 | SCREEN0101, SCREEN0102, ⋯, SCREEN0200 |
| ⋮ | ⋮ | ⋮ |

FIG. 4

| DISPLAY APPARATUS NAME | GROUP ID | IP ADDRESS | PORT NUMBER |
|---|---|---|---|
| SCREEN0001 | GRP1 | AAA. BBB. CCC. 101 | 9999 |
| SCREEN0101 | GRP2 | AAA. BBB. DDD. 101 | 9999 |
| ⋮ | ⋮ | ⋮ | ⋮ |

FIG. 5

| DISPLAY APPARATUS NAME | GROUP ID | PASSWORD |
|---|---|---|
| SCREEN0002 | GRP1 | SC0002abc |
| ⋮ | ⋮ | ⋮ |
| SCREEN0099 | GRP1 | SC0099abc |
| SCREEN0100 | GRP1 | SC0100abc |
| SCREEN0102 | GRP2 | SC0102abc |
| ⋮ | ⋮ | ⋮ |

FIG. 6

| DISPLAY APPARATUS NAME | GROUP ID | IP ADDRESS | PORT NUMBER |
|---|---|---|---|
| SCREEN0002 | GRP1 | AAA. BBB. CCC. 102 | 9998 |
| ⋮ | ⋮ | ⋮ | ⋮ |
| SCREEN0099 | GRP1 | AAA. BBB. CCC. 199 | 9998 |
| SCREEN0100 | GRP1 | AAA. BBB. CCC. 200 | 9998 |
| SCREEN0102 | GRP2 | AAA. BBB. DDD. 102 | 9998 |
| ⋮ | ⋮ | ⋮ | ⋮ |

| DISPLAY APPARATUS GROUP NAME | DISPLAY APPARATUS NAME | SIGNAGE DATA |
|---|---|---|
| IN-FRONT-OF-ENTRANCE-HALL GROUP | SCREEN0001, SCREEN0101 | data_entrance |
| ELEVATOR HALL GROUP | SCREEN0002, SCREEN0102 | data_elevator |
| ⋮ | ⋮ | ⋮ |

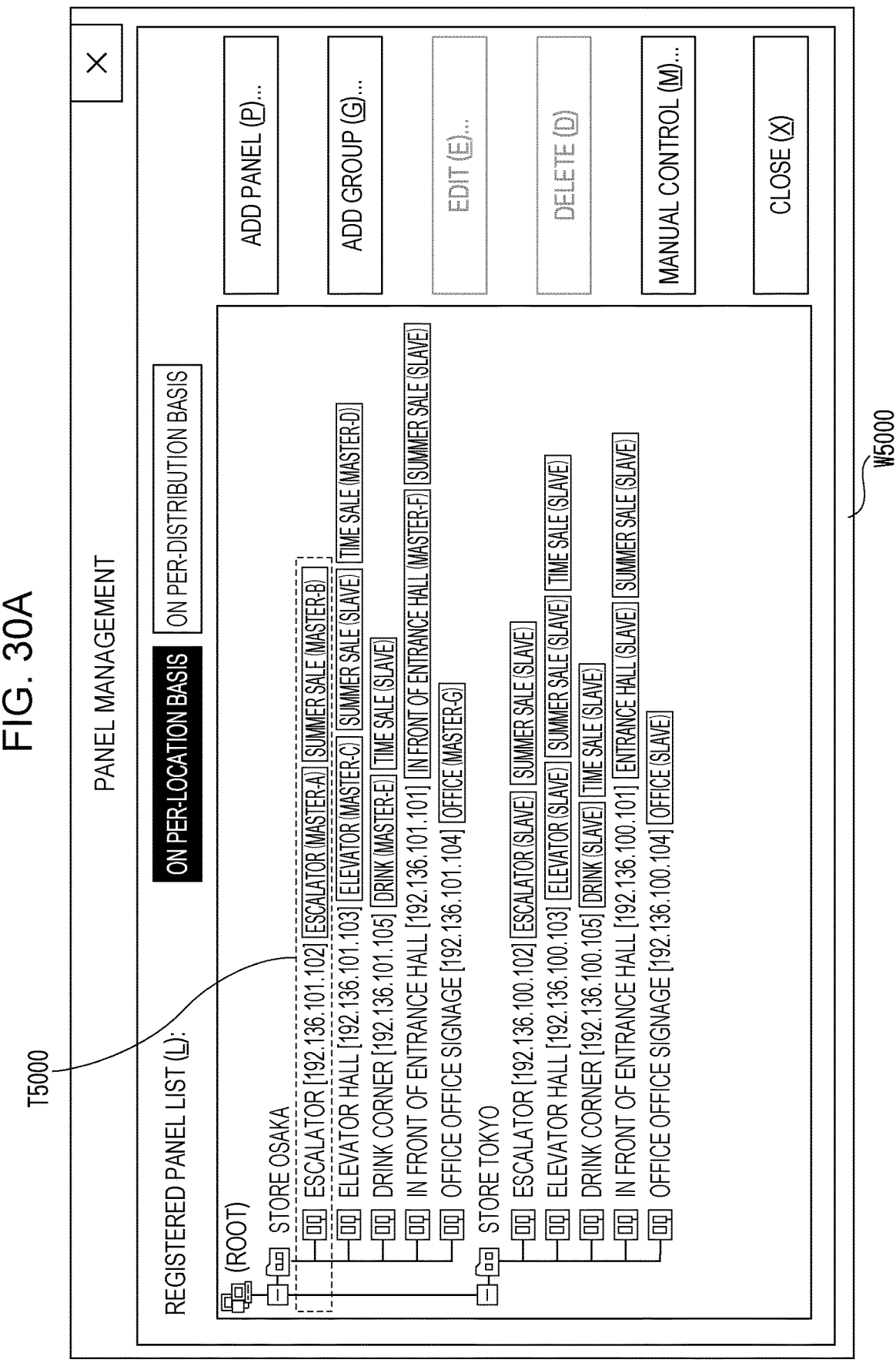

CONTENT DISTRIBUTION SYSTEM AND CONTENT DISTRIBUTION APPARATUS

BACKGROUND

1. Field

The present technology relates to a content distribution system and the like.

2. Description of the Related Art

In recent years, display apparatuses have been installed in places, such as a shopping center, where many people do the shopping, and so-called signage designed to display content, such as an advertisement, on the display apparatuses, has come into wide use. Along with this, there are an increasing number of cases in which many display apparatuses are managed.

For example, in some cases, a server that manages content manages a plurality of display apparatuses that are clients. In such cases, when content from a server is distributed to the plurality of display apparatuses, there is a concern that much time will be consumed until the distribution of the content is completed, or a concern that congestion will occur in a transfer path from the server to the display apparatus.

Accordingly, a technology that efficiently distributes the content is proposed. For example, the technology is disclosed in which the server includes a file transfer control unit and the client includes a file transfer control unit as well and in which the client transfers a file according to a request of any other client (for example, Japanese Unexamined Patent Application No. 2007-018294).

Furthermore, the technology is disclosed in which, with a relay management apparatus that is connected on the same network, the transfer of data between clients is realized (for example, Japanese Unexamined Patent Application. No. 2014-059706).

However, there are a problem that, with a network configuration of the display apparatus, all display apparatuses are not necessarily connected to the same network, and a problem that, with a type of connection to the display apparatus, flexible content distribution is difficult to realize.

Furthermore, for the purpose of operational management of digital signage, a case where during off-hours or in case of emergency, signage data is desired to be updated, a case where a request on the display apparatus side can be desirably made for the distribution of the signage data, and the like are also considered. However, in the technology that is disclosed in Japanese Unexamined Patent Application Nos. 2007-018294 and 2014-059706, the server provides an instruction for transfer, to the client. Because of this, there is a problem that the distribution is difficult to perform at a desired time.

It is desirable to provide a content distribution system and the like in which content is capable of being efficiently distributed in a case where the content is distributed from a server apparatus, which is in charge of distributing the content, to a display apparatus, based on a request of the display apparatus.

SUMMARY

According to an aspect of the present technology, there is provided a content distribution system in which content is distributed from a content distribution apparatus to a plurality of display apparatuses, in which the content distribution apparatus includes a storage unit in which the content is stored, a connection information acquisition control unit that acquires information on a connection request source as connection information on the display apparatus, when a connection request from each of the plurality of display apparatuses is present, a grouping control unit that, among the plurality of display apparatuses, groups display apparatuses to which the same content is to be distributed, into one group, a group management control unit that manages one display apparatus, which belongs to the group, as a master display apparatus and the other display apparatuses, which belongs to the group, as slave display apparatuses, and a transmission unit that transmits the content and the connection information on the slave display apparatus, to the master display apparatus, and in which the master display apparatus includes a content distribution control unit which makes a connection to the slave display apparatus based on the received connection information and distributes the content.

According to another aspect of the present technology, there is provided a content distribution system in which content is distributed from a content distribution apparatus to a plurality of display apparatuses, in which the content distribution apparatus includes a storage unit in which the content is stored, a connection information acquisition control unit that acquires information on a connection request source, as connection information on the display apparatus, when a connection request from each of the plurality of display apparatuses is present, a grouping control unit that, among the plurality of display apparatuses, groups display apparatuses to which the same content is to be distributed, into one group, a group management control unit that performs management to set one display apparatus, which belongs to the group, to be a master display apparatus, and to set the other display apparatuses, which belongs to the group, to be slave display apparatuses, a content transmission unit that distributes the content to the master display apparatus, and a connection information transmission unit that transmits connection information on the master display apparatus to the slave display apparatus, and in which the master display apparatus includes a content distribution control unit that makes a connection to the slave display apparatus and distributes the content in a case where a request for contention distribution from the slave display apparatus is received.

According to still another aspect of the present technology, there is provided a content distribution apparatus that distributes content from a content distribution apparatus to a plurality of display apparatuses, the content distribution apparatus including: a storage unit in which the content is stored; a connection information acquisition control unit that acquires information on a connection request source, as connection information on the display apparatus, when a connection request from the display apparatus is present; a grouping control unit that, among the plurality of display apparatuses, groups display apparatuses to which the same content is to be distributed, into one group; a group management control unit that manages one display apparatus, which belongs to the group, as a master display apparatus, and the other display apparatuses, which belongs to the group, as slave display apparatuses; and a transmission unit that transmits the content and the connection information on the slave display apparatus, to the master display apparatus, in order to distribute the content to the slave display apparatus through the master display apparatus.

According to still another aspect of the present technology, there is provide a content distribution apparatus that distributes content from a content distribution apparatus to a plurality of display apparatuses, the content distribution apparatus including: a storage unit in which the content is stored; a connection information acquisition control unit that acquires information on a connection request source, as connection information on the display apparatus, when a connection request from each of the plurality of display apparatuses is present; a grouping control unit that, among the plurality of display apparatuses, groups display apparatuses to which the same content is to be distributed, into one group; a group management control unit that manages one display apparatus, which belongs to the group, as a master display apparatus, and the other display apparatuses, which belongs to the group, as slave display apparatuses; a content transmission unit that makes a connection to the slave display apparatus and transmits the content to the master display apparatus in order to distribute the content, in a case where the master display apparatus receives a request for content distribution from the slave display apparatus; and a connection information transmission unit that transmits connection information on the master display apparatus to the slave display apparatus, in order for the slave display apparatus to transmit the request for content distribution to the master display apparatus.

According to still another aspect of the present technology, there is provided a content distribution method of distributing content from a content distribution apparatus to a plurality of display apparatuses, the method including: causing the content distribution apparatus to store the content, acquire information on a connection request source, as connection information on the display apparatus, when connection requests from, the plurality of display apparatuses are present, group display apparatuses to which the same content is to be distributed, among the plurality of display apparatuses, into one group, perform one display apparatus as a master display apparatus and the other display apparatuses as slave display apparatuses, among the display apparatuses, and transmit the content and the connection information on the slave display apparatus that belongs to the group, to the master display apparatus, and causing the master display apparatus to perform making a connection to the slave display apparatus based on the received connection information and distribute the content.

According to still another aspect of the present technology, there is provided a content distribution method of distributing content from a content distribution apparatus to a plurality of display apparatuses, the method including causing the content distribution apparatus to store the content, acquire information on a connection request source, as connection information on the display apparatus, when a connection request from each of the plurality of display apparatuses is present, group display apparatuses to which the same content is to be distributed, among the plurality of display apparatuses, into one group, perform one display apparatus, which belongs to the group, as a master display apparatus, and the other display apparatuses, which belongs to the group, as slave display apparatuses, transmit the content to the master display apparatus and transmit connection information on the master display apparatus to the slave display apparatus, and transmit the connection information on the master display apparatus to the slave display apparatus; and causing the master display apparatus to make a connection to the slave display apparatus and distribute the content, in a case where a request for content distribution from the slave display apparatus is received.

According to still another aspect of the present technology, there is provided a non-transitory recording medium on which a program is stored, the program causing a computer that distributes content from a content distribution apparatus to a plurality of display apparatuses, to perform: a storage function of storing the content; a connection information acquisition function of acquiring information on a connection request source, as connection information on the display apparatus, when a connection request from each of the plurality of display apparatuses is present; a grouping function of grouping display apparatuses to which the same content is to be distributed, among the plurality of display apparatuses into one group; a group management function of managing one display apparatus, which belongs to the group, as a master display apparatus, and the other display apparatuses, which belongs to the group, as slave display apparatuses; and a transmission function of transmitting the content and the connection information on the slave display apparatus, to the master display apparatus, in order to distribute the content to the slave display apparatus through the master display apparatus.

According to still another aspect of the present technology, there is provided a non-transitory recording medium on which a program is stored, the program causing a computer that distributes content from a content distribution apparatus to a plurality of display apparatuses, to realize: a storage function of storing the content; a connection information acquisition function of acquiring information on a connection request source, as connection information on the display apparatus, when a connection request from the display apparatus is present; a grouping function of grouping display apparatuses to which the same content is to be distributed, among the plurality of display apparatuses into one group; a group management function of managing one display apparatus, which belongs to the group, as a master display apparatus, and the other display apparatuses as slave display apparatuses; a content transmission function of making a connection to the slave display apparatus and transmitting the content to the master display apparatus in order to distribute the content, in a case where the master display apparatus receives a request for content distribution from the slave display apparatus; and a connection information transmission function that transmits the connection information on the master display apparatus to the slave display apparatus, in order for the slave display apparatus to transmit the request for content distribution to the master display apparatus.

BRIEF DESCRIPTION OF THE DRAWINGS

FIG. 2 is a diagram for describing a functional configuration of a management server apparatus in the first embodiment;

FIGS. 3A and 3B are diagrams for describing data structures, respectively, of display apparatus information and grouping information in the first embodiment;

FIG. 4 is a diagram for describing a data structure of master information in the first embodiment;

FIG. 5 is a diagram for describing a data structure of authentication information in the first embodiment;

FIG. 6 is a diagram for describing a data structure of connection information in the first embodiment;

FIGS. 30A and 30B are diagrams for describing examples, respectively, of a screen on which a situation of grouping in a fifth embodiment is displayed on a per-location basis and a screen on which the situation of grouping in the fifth embodiment is displayed on a per-distribution basis.

DESCRIPTION OF THE EMBODIMENTS

Embodiments of the present technology will be described below with reference to the drawings. It is noted that in the present embodiment of the present technology, as an example, a digital signage system 1 is described in which a content distribution system that includes a content distribution apparatus which possibly distributes content finds application.

1. First Embodiment

1.1 Entire Configuration

Figure 1:
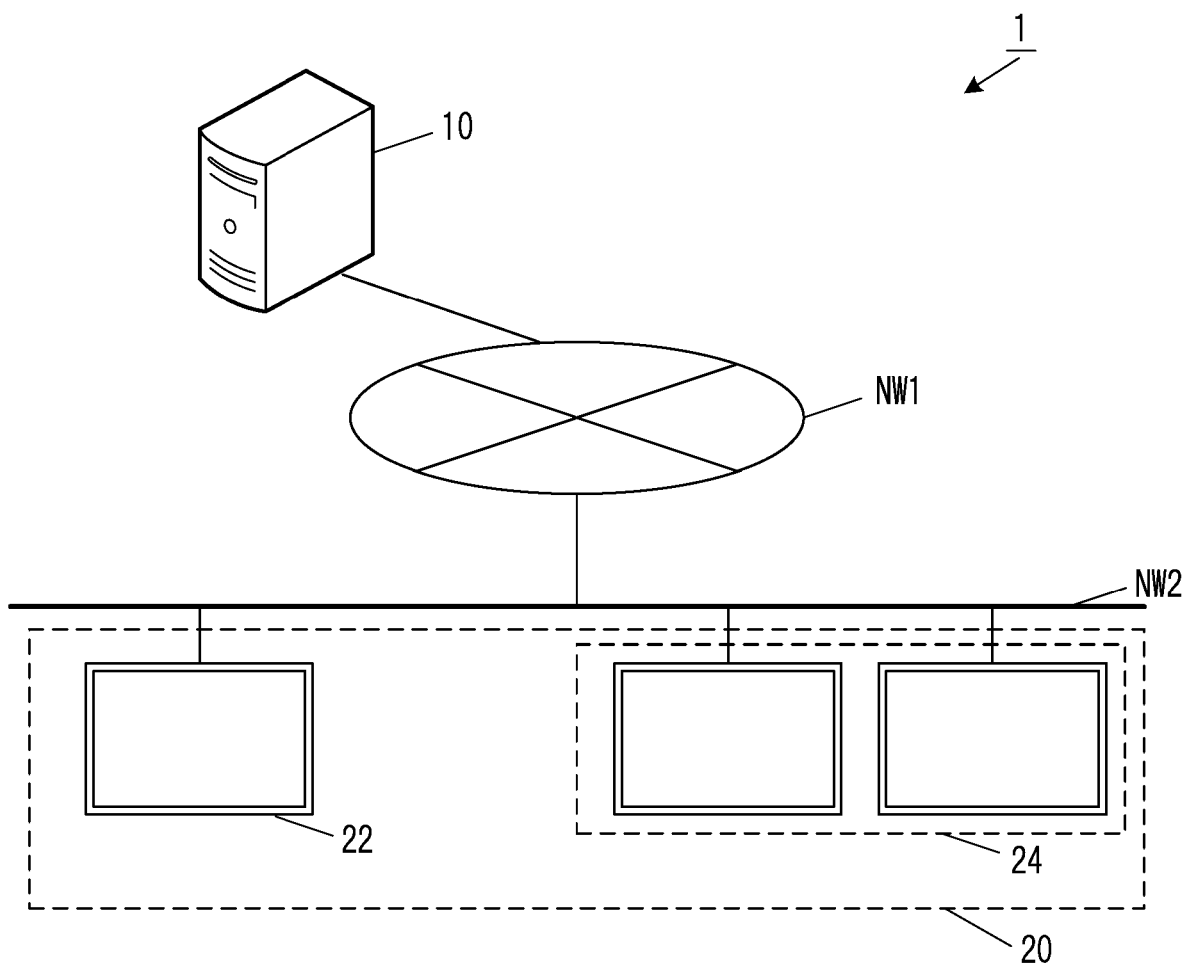
FIG. 1 is a diagram for describing an outline of a digital signage system in a first embodiment.

First, an entire configuration of the digital signage system 1 according to the present embodiment is described with reference to FIG. 1. As illustrated in FIG. 1, a management server apparatus 10 (the content distribution apparatus) that manages signage data (including content data) and distributes the signage data to a display apparatus, and a plurality of display apparatuses 20 on the signage data is displayed are connected to the digital signage system 1.

The management server apparatus 10 and the display apparatus 20 here are connected to each other by way of an (external) network NW1. Furthermore, each display apparatus 20 is connected to a network NW2. It is noted that in the present embodiment, display apparatuses 20 are configured to include a master display apparatus 22 that receives signage data from the management server apparatus 10 and transmits the signage data to any other display apparatus, and a slave display apparatus 24 that receives the signage data from the master display apparatus. The master display apparatus 22 and the slave display apparatus 24 will be described in detail below. At this point, the network NW2 is described as one network, but may be connected to any other network (for example, any other network by way of the network NW1).

The signage data here refers to data content data the purpose of which is to be reproduced for display on the display apparatus 20. Furthermore, included in the signage data is schedule data for defining a display schedule, such as a starting point in time at which the content is displayed or the display time for which the content data is displayed, or layout data for defining a display layout on which each content item is displayed for a case where a plurality of content items are displayed at the same time.

It is noted that in FIG. 1, the management server apparatus 10 and the display apparatus are connected to each other with a network that is separated, from the network NW2, by way of an external network NW1 and that the display apparatuses are connected to each other with the same network NW2, and but that this configuration may not be employed. For example, the management server apparatus 10 and the display apparatus 20 may be connected to each other with the same network NW.

1.2 Functional Configuration

1.2.1 Management Server Apparatus

Subsequently, the management server apparatus 10 is described with reference to FIG. 2. The management server apparatus 10 plays a role in serving as a distribution apparatus that distributes signage data including content data to the display apparatus 20. The management server apparatus 10 here includes a control unit 100, a communication unit 110, and a storage unit 120.

The control unit 100 is a function unit for controlling the entire management server apparatus 10. The control unit 100 is realized by reading and executing various programs, and is configured, for example, with a Central Processing Unit (CPU) or the like.

The communication unit 110 is a functional unit desirable for the management server apparatus 10 to perform communication with an external apparatus. For example, the communication unit 110 is realized by a network interface card (NIC) that is used for a wired or wireless LAN or a communication module that is connectable to 3G and LTE lines.

The storage unit 120 is a functional unit in which various programs desirable for operation of the management server apparatus 10, or various pieces of data are stored. The storage unit 120 is configured, for example, with a Solid State Drive (SSD) that is a semiconductor memory, a hard disk drive (HDD), or the like.

Included in the storage unit 120 are particularly, a signage data storage area 122 in which signage data for distribution to the display apparatus 20 is stored, display apparatus information 124 in which information relating to the display apparatus 20 is stored, a grouping information 126 that results from grouping the display apparatuses 20, master information 128 in which information relating to the master display apparatus 22 is stored, authentication information 130 in which information for authentication (logging in to) to the slave display apparatus 24 is stored, and connection information 132 in which information for a connection to the slave display apparatus 24 is stored.

The signage data storage area 122 is an area in which signage data that is distributed to the display apparatus 20 is stored. Included in the signage data are pieces of data desirable for display of content, such as the content data, the schedule data, the layout data.

The content data here is data that is reproducible for display on the display apparatus 20, and is data of a moving image or a still image. Examples of moving image data may include pieces of moving image data, such as for Audio Video Interleave (an avi file), Windows Media Video (a wmv file), and MPEG (an mpg file). Furthermore, pieces of still image data may include pieces of data for image formats such as JPEG (a jpg file), Portable Network Graphics (a png file), Graphics Interchange Format (a gif file). Furthermore, pieces of still image data may include simple text data, and may include audio data for audio output.

Furthermore, the schedule data is data for defining a date, a day of the week, a time segment, a point in time, the display time, or the like. Pieces of schedule data include a calendar schedule that includes a schedule which is displayed every day or every day of the week, and a timetable for designating a schedule that is to be displayed during a time segment of a day, at a point in time, or for the display time. The layout data is data for defining a position on the display screen, in which content data is displayed. For example, it is possible that a plurality of pieces of content data that result from dividing the display screen are displayed, or that picture-in-picture display is performed.

It is noted that signage data which is created by a manager of the digital signage system 1 may be stored or signage data that is received from the outside may be stored in the signage data storage area 122.

The display apparatus information 124 is information that results from storing information relating to the display apparatus 20. For example, as illustrated in FIG. 3A, a display apparatus name (for example, "SCREEN0001") for identifying the display apparatus 20, an IP address (for example, "AAA.BBB.CCC.101") of the display apparatus, a port number (for example, "9999") of the display apparatus, a password (for example, "SC0001abc") for logging in to the display apparatus, and an attribute (for example, "OSAKA" as attribute 1, and "OSAKA 1" as attribute 2) are stored. As the attribute of the display apparatus here, for example, an attribute relating to operational management, such as a location indicating a facility in which the display apparatus 20 is installed, a branch office ID, and the purpose of use, or an attribute relating to performance, such as performance of a CPU, a capacity of a storage area may be stored.

The information on the display apparatus 20, which is stored in the display apparatus information 124 may be manually registered by the manager of the digital signage system 1 or the like, and may be automatically registered. As a method of automatic registration, a method is considered in which the display apparatus 20 to which signage data within a search is conducted on a network that is distributable and in which a program for registering the found display apparatus 20 with the display apparatus information 124 is executed.

The grouping information 126 is information that, when grouping the display apparatuses 20 into groups, indicates a correspondence relationship among the group, the display apparatus 20, and signage data that is distributed to the group. For example, as illustrated in FIG. 3B, a group ID (for example, "GRP1") for identifying a group, signage data (for example, "data1"), and display apparatuses (for example, "SCREEN0001, SCREEN0002, and so forth up to SCREEN0100") to which the signage is distributed are stored in an associated manner. In the present embodiment, as the signage data, a place on the signage data storage area 122, in which the signage data is stored is stored, but a method in which signage data that is distributed to a group can be specified may be stored.

The master information 128 is information that results from storing the information relating to the master display apparatus 22 that is determined for every group. FIG. 4 is a diagram illustrating a data configuration of the master information 128. Included in the master information 128 are a display apparatus name (for example, "SCREEN001") that is a master display apparatus, a group ID (for example, "GRP1") of a group to which the master display apparatus 22 belongs, an IP address (for example, "AAA.BBB.CCC.101") of the master display apparatus 22, and a port number (for example, "9999") of the master display apparatus 22.

The authentication information 130 is information (that is, information for authentication by the slave display apparatus 24) for logging in to the slave display apparatus 24 that is an apparatus other than the master display apparatus 22 within a group. FIG. 5 is a diagram illustrating a data configuration of the authentication information 130. Included in the authentication information 130 are a display apparatus name (for example, "SCREEN002"), a group ID (for example, "GRP1"), and a password (for example, "SC0002abc") for the slave display apparatus 24.

The connection information 132 is information (connection information) desirable for the connection to the slave display apparatus 24 that is determined for every group. FIG. 6 is a diagram illustrating data configuration of the connection information 132. Stored in the connection information 132 are a display apparatus name (for example, "SCREEN002") that corresponds to the slave display apparatus 24, a group ID (for example, "GRP1") of a group to which the slave display apparatus 24 belongs, an IP address (for example, "AAA.BBB.CCC.102") of the slave display apparatus 24, and a port number (for example, "9998") of the slave display apparatus 24.

1.2.2 Master Display Apparatus

Figure 7:
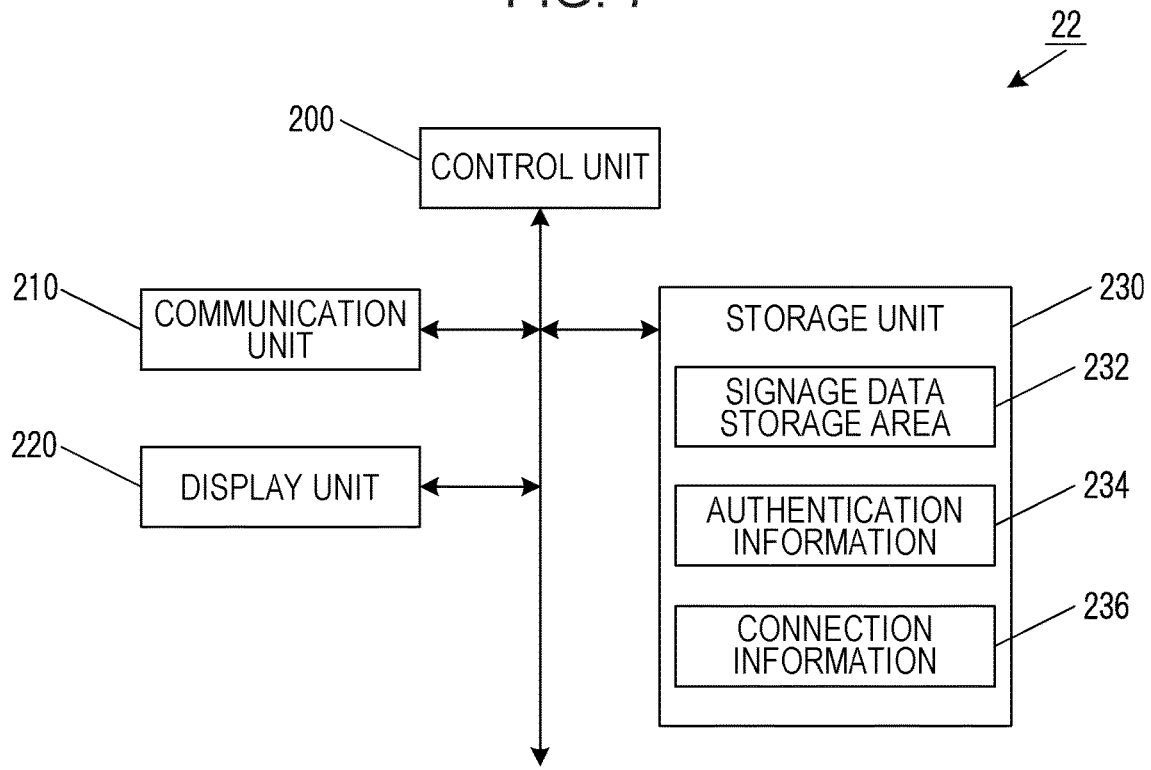
FIG. 7 is a diagram for describing a functional configuration of a master display apparatus in the first embodiment.

Subsequently, the master display apparatus 22 is described with reference to FIG. 7, The master display apparatus 22 is configured to include a control unit 200, a communication unit 210, a display unit 220, and a storage unit 230.

The control unit 200 is a functional unit for controlling the entire master display apparatus 22. The control unit 200 is realized by reading and executing various programs, and is configured, for example, with a CPU or the like.

The communication unit 210 is a functional unit desirable for the master display apparatus 22 to perform communication with an external apparatus. For example, the communication unit 210 is realized by a NIC that is used for a wired or wireless LAN or a communication module that is connectable to the 3G and LTE lines.

The display unit 220 is a functional unit for displaying content data that is stored in the signage data. For example, the display unit 220 is configured with an LCD, an organic EL display, a projector, or the like.

The storage unit 230 is a functional unit in which various programs desirable for operation of the master display apparatus 22 or various pieces of data are stored. The storage unit 230 is configured, for example, with an SSD that is a semiconductor memory, an HDD, or the like.

Stored in the storage unit 230 are particularly a signage data storage area 232 in which signage data that is distributed from the management server apparatus 10 is stored, authentication information 234 in which authentication information that is transmitted from the management server apparatus 10 is stored, and connection information 236 in which connection information that is transmitted from the management server apparatus 10 is stored.

The signage data here, which is transmitted from the management server apparatus 10, is signage data that is distributed by the master display apparatus 22 to the slave display apparatus 24, among pieces of signage data that are stored in the signage data storage area 122 of the management server apparatus 10. Furthermore, the authentication information that is transmitted from the management server apparatus 10 is authentication information relating to the slave display apparatus 24 that is set, by the master display apparatus 22, to be a distribution destination of signage data, among pieces of authentication information 130 that are stored in the management server apparatus 10. Furthermore, the connection information that is transmitted from the management server apparatus 10 is connection information relating to the slave display apparatus 24 that is set, by the master display apparatus 22, to be a distribution destination of signage data, among pieces of connection information 132 that are stored in the management server apparatus 10.

1.2.3 Slave Display Apparatus

Figure 8:
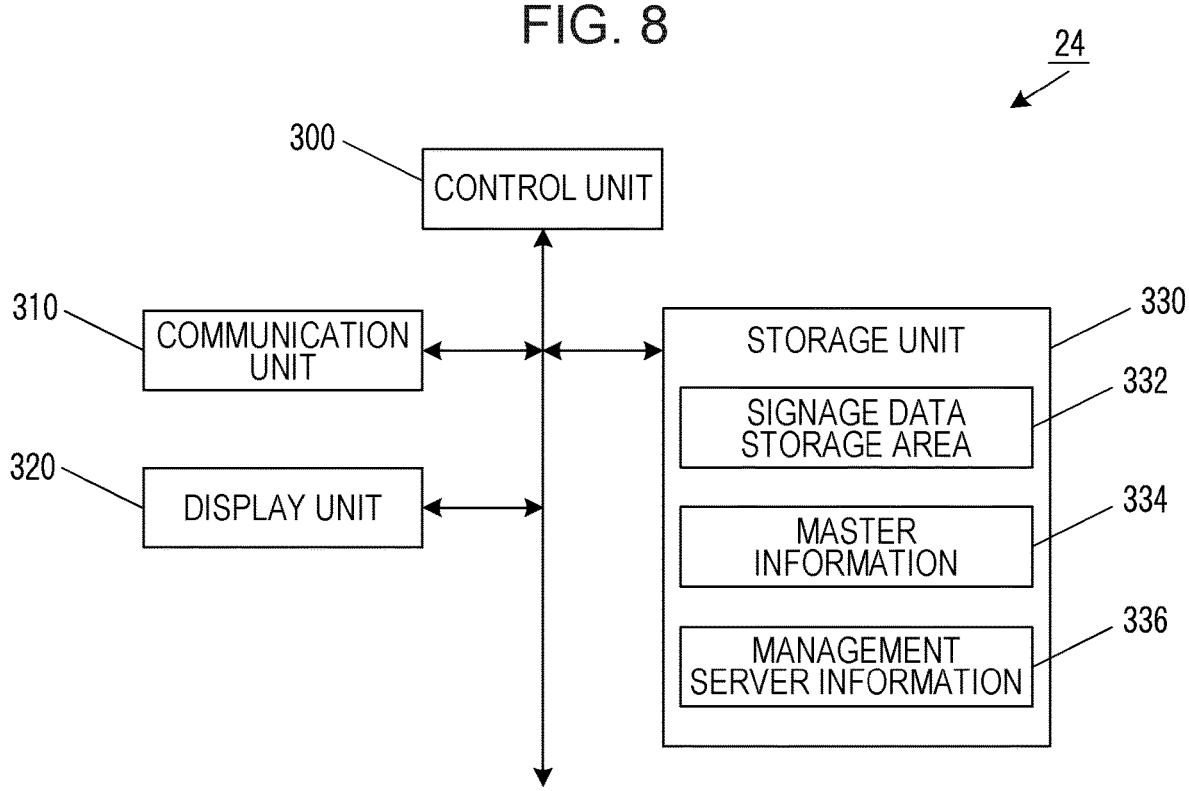
FIG. 8 is a diagram for describing a functional configuration of a slave display apparatus in the first embodiment.

Subsequently, each of the slave display apparatuses 24 is described with reference to FIG. 8. The slave display apparatus 24 is configured to include a control unit 300, a communication unit 310, a display unit 320, and a storage unit 330.

The control unit 300 is a functional unit for controlling the entire slave display apparatus 24. The control unit 300 is realized by reading and executing various programs, and is configured, for example, with a CPU or the like.

The communication unit 310 is a functional unit desirable for the slave display apparatus 24 to perform communication with an external apparatus. For example, the communication unit 310 is realized by a NIC that is used for a wired or wireless LAN or a communication module that is connectable to the 3G and LTE lines.

The display unit 320 is a functional unit for displaying the content data that is stored in the signage data. For example, the display unit 320 is configured with an LCD, an organic EL display, a projector, or the like.

The storage unit 330 is a functional unit in which various programs desirable for operation of the slave display apparatus 24 or various pieces of data are stored. The storage unit 230 is configured, for example, with an SSD that is a semiconductor memory, an HDD, or the like.

Stored in the storage unit 330 are particularly a signage data storage area 332 in which signage data that is distributed from the master display apparatus 22 is stored, master information 334 in which master information that is transmitted from the management server apparatus 10 is stored, and management server information 336 in which connection information on the management server apparatus 10 is stored.

The master information here, which is transmitted from, the management server apparatus 10, is connection information relating to the master display apparatus 22 that is set, by the slave display apparatus 24, to be a distribution of signage data, among pieces of master information 128 that are stored in the management server apparatus 10.

Furthermore, connection information, such as an IP address or a port number of the management server apparatus 10, is stored, and, for example, is stored in advance, by the manager of the digital signage system 1, or the like, in the management server information 336.

1.3 Flow for Processing 1.3.1 Processing by the Management Server Apparatus

Figure 9:
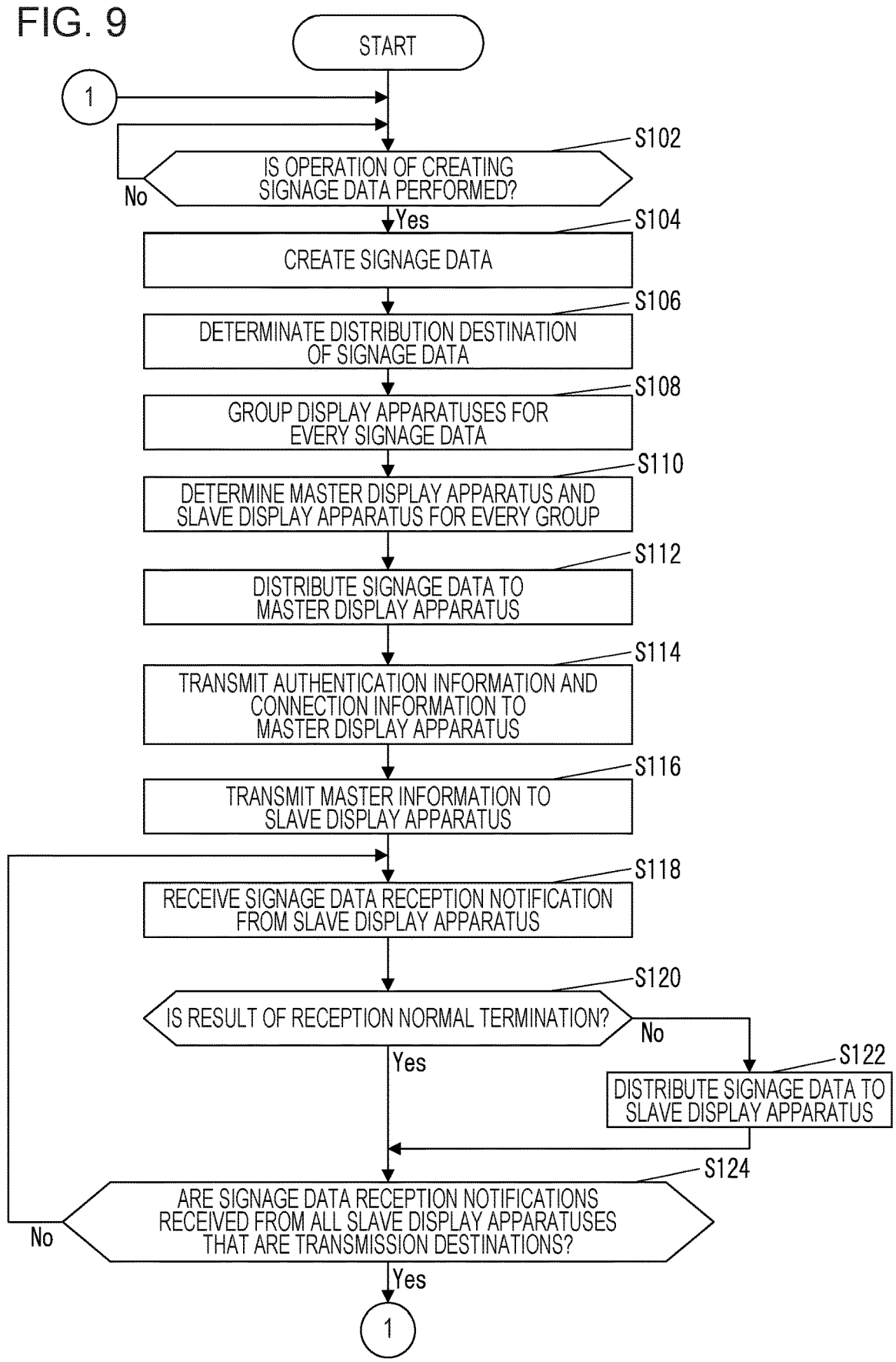
FIG. 9 is a flowchart for describing processing by the management server apparatus in the first embodiment.

Subsequently, a flow for processing by the management server apparatus 10 is described with reference to FIG. 9. First, it is determined whether or not an operation of creating signage data is performed (Step S102). For example, it is determined whether the manager of the digital signage system 1 or the like operates the management server apparatus 10 and performs the operation of creating signage data.

In a case where the operation of creating signage data is performed, creation of signage is performed (if the result is Yes in Step S102, proceeding to Step S104 takes place). Specifically, the content data, the schedule data, and the layout data that are created by the manager are stored in the signage data storage area 122 as pieces of signage data. A method of creating signage data, for example, is performed by performing registration of the content data or by stipulating the time for which the registered content data is displayed or the display area on which the registered content data is displayed, using an editor for creating signage data.

Subsequently, a distribution destination of the signage data is determined (Step S106). The distribution destination may be determined for every display apparatus, and may be determined for every piece of signage data. For example, the manager of the digital signage system 1, or the like designates to which one of the display apparatuses 20 the signage data that is created in Step S104 is distributed, and thus the destination of the distribution is determined. Alternatively, it may be designated which signage data is distributed to every display apparatus 20 and thus the destination of the distribution may be determined.

Subsequently, the display apparatuses 20 are grouped that distribute the same signage data, and a group ID, signage data that is distributed to the group, and a name of a display apparatus that belongs to the group are stored in the grouping information 126 (Step S108). It is noted that a serial number may be automatically assigned to the group ID and that the manager of the digital signage system 1, or the like may input the serial number.

Furthermore, in the case of a plurality of types of pieces of signage data that are to be distributed, a plurality of groups are also available. Moreover, even in the case of the display apparatus 20 that distributes the same signage data, the grouping may be performed based on attributes of the display apparatus 20, such as a branch office ID, a location, and an installation place. For example, in a case where a plurality of display apparatuses 20 are installed in two or more branch offices, the display apparatus 20 that has the same branch ID is set to belong to one group. In this manner, the display apparatus 20 that is installed within a branch office can be set to belong to the same group. Therefore, because distribution of the signage data among the display apparatuses 20 within the branch office is performed, it is possible that the signage data is more efficiently distributed.

Subsequently, the master display apparatus 22 is determined for every group that results from the processing in Step S108. Furthermore, a display apparatus other than the master display apparatus 22 within the group is set to be the slave display apparatus 24. Then, the master display apparatus 22 and the slave display apparatus 24 are managed (Step S110).

Specifically, a display apparatus that is the master display apparatus 22 is determined for every group, and a display apparatus name of the master display apparatus 22, a group ID of a group to which the master display apparatus 22 belongs, and an IP address and a port number of the master display apparatus 22, which are stored in the display apparatus information 124, are stored in the master information 128. As the slave display apparatus 24, the display apparatus 20 other than the master display apparatus 22 stores a display apparatus name of the slave display apparatus 24, a group ID of a group to which the slave display apparatus 24 belongs, and a password for the slave display apparatus 24, which is stored in the display apparatus information 124, are stored in the authentication information 130. Furthermore, the display apparatus name of the slave display apparatus 24, the group ID of a group to which the slave display apparatus 24 belongs, the IP address and the port number of the master display apparatus 22, which are stored in the display apparatus information 124, are stored in the connection information 132.

A method of determining the master display apparatus 22 in the present embodiment is a method of determining a display apparatus that is in the first position in a case where display apparatus names are arranged side by side in ascending order, as the display apparatus 22, is employed, but other methods may be employed. For example, performance of a CPU or an installed memory of each display apparatus 20 may be stored in advance in the management server apparatus 10, and the display apparatus 20 that has a higher capability may be determined preferentially as the master display device. That is, the determination of the master display apparatus 22 and the slave display apparatus 24 can be made automatically by the management server apparatus 10 according to a given method. Furthermore, the display apparatus 20 that is set to be the master display apparatus 22 may be set up by the manager of the digital signage system 1, or the like.

Furthermore, the number of master display apparatuses 22 that is determined for every group is 1 in the present embodiment, but may be equal to or greater than 1. For example, a plurality of master display apparatus 22 may be determined based on an installation situation of the display apparatus 20, a situation of a network, the degree of load distribution, or the like. That is, the grouping is described as being performed for every piece of signage data is described, but, in a case where the same signage data is distributed to a plurality of master display apparatuses 22 and the grouping is performed for every master display apparatus 22.

Subsequently, based on the grouping information 126 that is stored in S108, signage that is to be distributed to a group to which the master display apparatus 22 belongs is distributed to the master display apparatus 22 that is determined in Step S110 (Step S112). Furthermore, the authentication information 130 and the connection information 132 on the slave display apparatus 24 that belongs to the same group is transmitted to the master display apparatus 22 (Step S114).

Subsequently, based on the grouping information 126 that is stored in Step S108, the master information 128 of the master display apparatus 22 is transmitted to the slave display apparatus 24 that belongs to a group to which a group represented by the master display apparatus 22 belongs (Step S116).

With Step S114 and Step S116, it is possible that the master display apparatus 22 is connected to each slave display apparatus 24, and it is also possible that each slave display apparatus 24 is connected to the master display apparatus 22.

At this point, in the present embodiment, in order to make the connection to the slave display apparatus 24, the master display apparatus 22 uses the TP address and the port number of the slave display apparatus 24 that are transmitted from the management server apparatus 10. Furthermore, the password that is transmitted from the management server apparatus 10 is used for logging in to (being authenticated to) the slave display apparatus 24.

Furthermore, with the IP address and the port number of the master display apparatus 22, which are transmitted from the management server apparatus 10, the slave display apparatus 24 verifies the legitimacy of the master display apparatus 22 that is connected to the slave display apparatus 24. That is, when detecting a connection by the display apparatus 20, the slave display apparatus 24 determines whether or not the IP address and the port number of the display apparatus 20 that is a connection source are matched with the IP address and the port number, respectively, of the master display apparatus 22, which are transmitted from the management server apparatus 10. If so, the display apparatus 20 is regarded as the master display apparatus 22, and thus the connection is made to the display apparatus 20.

Subsequently, a signage data reception notification that is transmitted from the slave display apparatus 24 is received (Step S118). The signage data reception notification here is a signal that is transmitted directly to the management server apparatus 10 from the slave display apparatus 24 without the master display apparatus 22 being involved, and is a signal for notifying whether or not signage data (content) is received. In the present embodiment, it is assumed that a result of reception indicating the signage is included in the signage data reception notification.

Subsequently, it is determined whether or not the result of reception that is included in the signage data reception notification which is received in Step S118 is normal termination (Step S120). In a case where the result of reception is not the normal termination, signage data is distributed the slave display apparatus 24 that is a transmission source of the signage data reception notification (Step S122). Specifically, the signage data that is to be distributed to the slave display apparatus 24 is specified with reference to the grouping information 126. Then, the specified signage data is distributed directly to the slave display apparatus 24 without the master display apparatus 22 being involved.

It is noted that in the present embodiment, the management server apparatus 10 is described as distributing signage data to the slave display apparatus 24 based on the result of reception, but may distribute the signage data based on a request of the slave display apparatus 24. That is, in a case where the distribution of the signage from the master display apparatus 22 is not normally terminated, the slave display apparatus 24 may request the management server apparatus 10 to directly distribute the signage data. In this case, based on a signage data distribution request from the slave display apparatus 24, the management server apparatus 10 distributes the signage data to the slave display apparatus 24.

Subsequently, it is whether or not signage data reception notifications are received from all the slave display apparatuses 24 that are distribution destination (Step S124). In a case where the signage data reception notifications are received from all the slave display apparatuses 24 that are the distribution destinations, it is determined that the distribution of the signage data is completed, and returning to Step S102 takes place (if the result is Yes in Step S124, proceeding to Step S102 takes place). In the other cases, because the distribution of the signage data is not ended, returning to Step S118 takes place (if the result is No in Step S124, returning to Step S118 takes place).

With the processing described above, the management server apparatus 10 transmits the signage data, and the authentication information and the connection information on the slave display apparatus 24 that belongs to the same group as the master display apparatus 22, to the master display apparatus 22, and thus, it is possible that the signage data is distributed to all the display apparatus 20 that belong to the group.

1.3.2 Processing by the Master Display Apparatus

Figure 10:
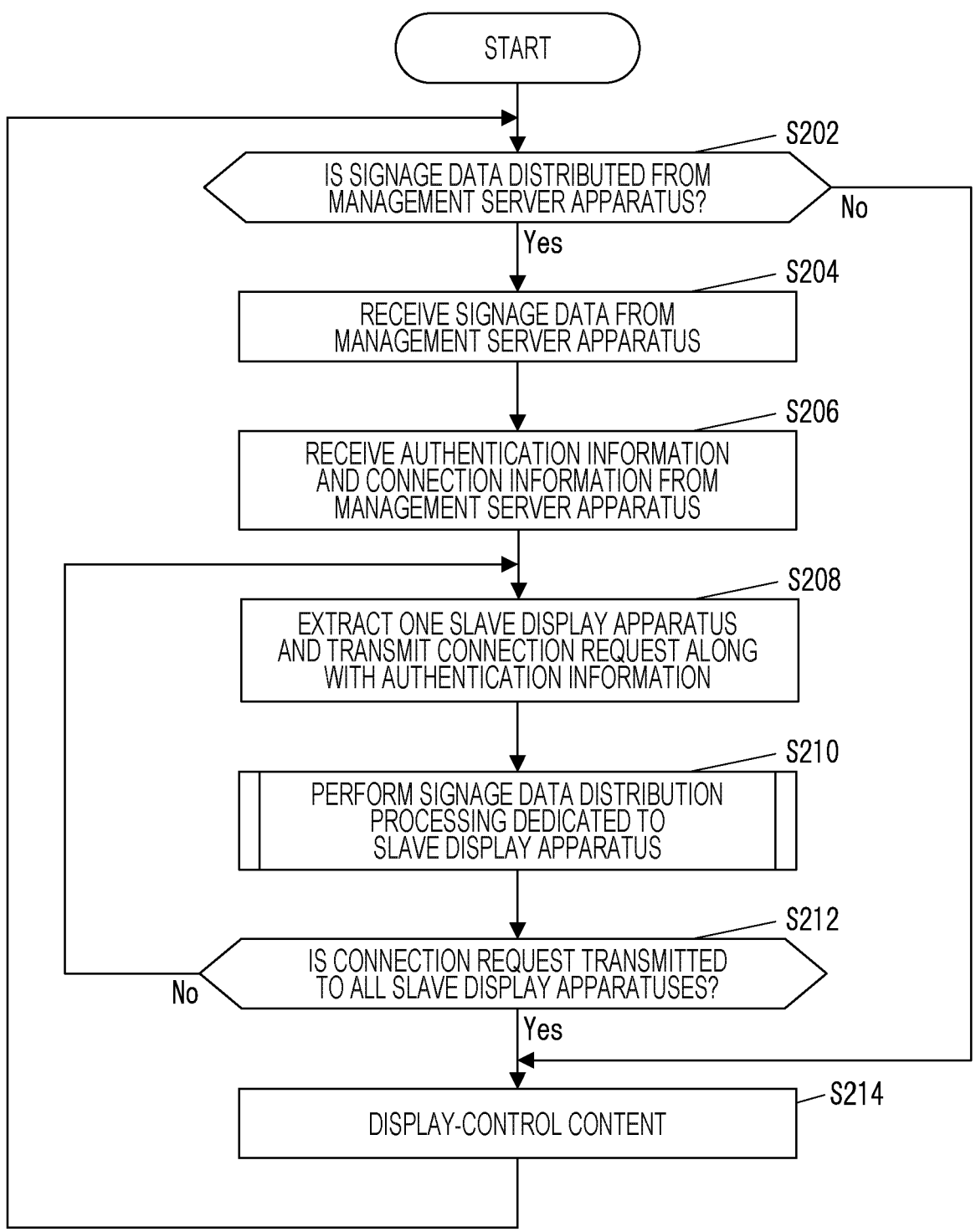
FIG. 10 is a flowchart for describing processing by the master display apparatus in the first embodiment.

Subsequently, a flow for processing by the master display apparatus 22 is described with reference to FIG. 10. First, it is determined where or not signage data is distributed from the management server apparatus 10 (Step S202). In a case where the signage data is not distributed, content display control is performed (if the result is No in Step S202, proceeding to Step S214 takes place). The content display control will be described below.

In a case where the signage data is distributed from the management server apparatus 10, the distributed signage data is received, and is stored in the signage data storage area 232 (If the result is Yes in Step S202, proceeding to Step S204 takes place). Furthermore, with Step S114 in FIG. 9, the authentication information and the connection information that are transmitted from the management server apparatus 10 are received, and are stored, as the authentication information 234 and the connection information 236 (Step S206).

Subsequently, one slave display apparatus 24 that does not yet distribute the signage data is extracted from the connection information 236, the connection to the slave display apparatus 24 is made, a connection request is transmitted to the slave display apparatus 24, along with a password (authentication information) for the slave display apparatus 24 (Step S208). Specifically, one slave display apparatus 24 that does not yet distribute the signage data is extracted from the connection information 236, and the IP address and the port number of the extracted slave display apparatus 24 is extracted from the connection information 236. Furthermore, the password for the slave display apparatus 24 is extracted from the authentication information 234. Thereafter, the connection to the slave display apparatus 24 is made based on the IP address and the port number that are extracted from the connection information 236, the password for the slave display apparatus 24 is transmitted along without the connection request.

Figure 11:
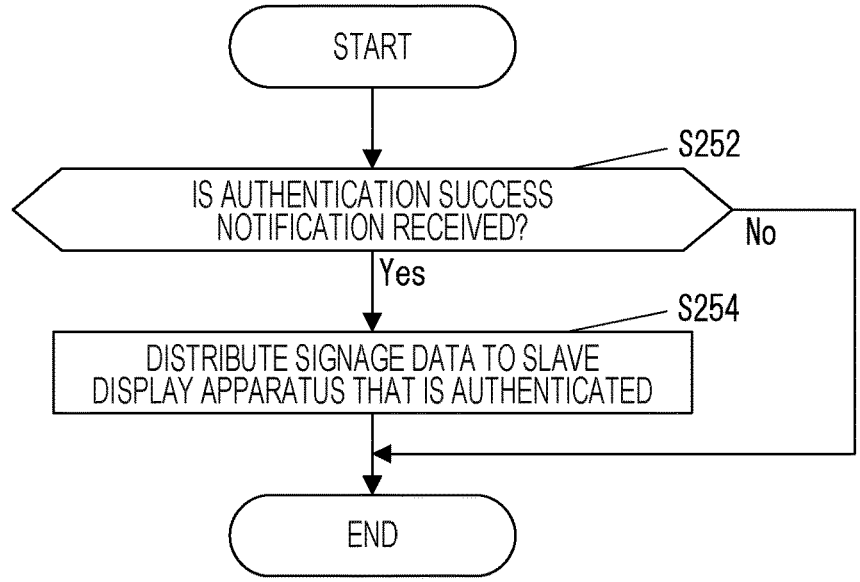
FIG. 11 is a flowchart for describing signage data distribution processing dedicated to the slave display apparatus in the first embodiment.

Subsequently, distribution processing of the signage data is performed on the slave display apparatus 24 to which the signage is not yet distributed (Step S210). The processing that is performed in Step S210 is referred to as signage data distribution processing dedicated to the slave display apparatus, and the detail thereof is described with reference to FIG. 11.

First, it is determined whether or not, as a response to the connection request that is transmitted to the slave display apparatus 24 in Step S208, an authentication success notification is received from the slave display apparatus 24 (Step S252).

In a case where the authentication success notification is received, the signage data is distributed to the authenticated slave display apparatus 24 (if the result is Yes in Step S252, proceeding to Step S254 takes place). In a case where the authentication success notification is not received, the distribution of the signage data is not performed on the slave display apparatus (No in Step S252).

With reference back to FIG. 10, it is determined whether or not the connection request is transmitted to all the slave display apparatus 24 that are stored in the connection information 236 (Step S212). In a case where the connection request is not transmitted to all the slave display apparatus 24, returning to the processing in Step S208 takes place (if the result is No in Step S212, proceeding to Step S208 takes place). With the processing described above, based on the connection information that is transmitted from the management server apparatus 10, the master display apparatus 22 can distribute the signage data to the slave display apparatus 24 within the group.

In a case where the connection request is transmitted to all the slave display apparatus 24, the content that is stored in the signage data storage area 232 is display-controlled (Step S214). At this time, in a case where schedule data or layout data is included in the signage data storage area, display of the content data is performed based on the schedule data or the layout data.

1.3.3 Processing by the Slave Display Apparatus

Figure 12:
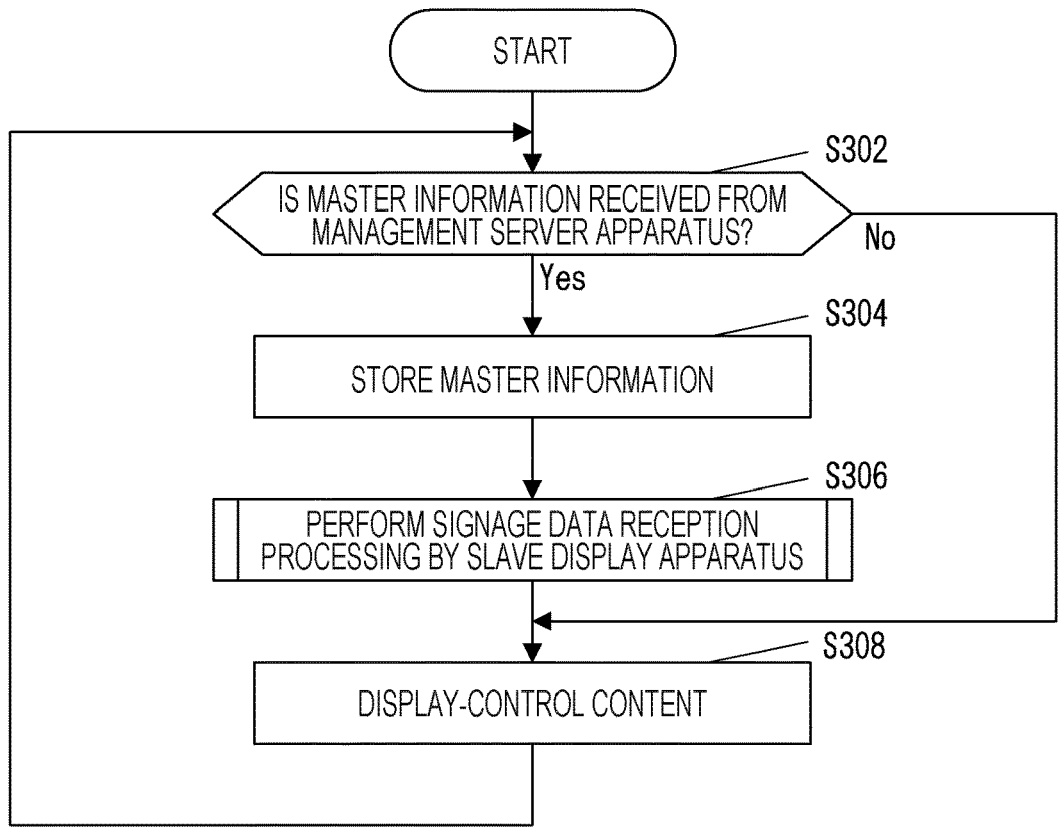
FIG. 12 is a flowchart for describing processing by the slave display apparatus in the first embodiment.

Subsequently, a flow for processing by the slave display apparatus 24 is described with reference to FIG. 12. First of all, it is determined in Step S116 in FIG. 9 whether the master information is received from the management server apparatus 10 (Step S302). In a case where the master information is received, the received master information is stored as the master information 334 (if the result is Yes in Step S302, proceeding to Step S304 takes place).

Figure 13:
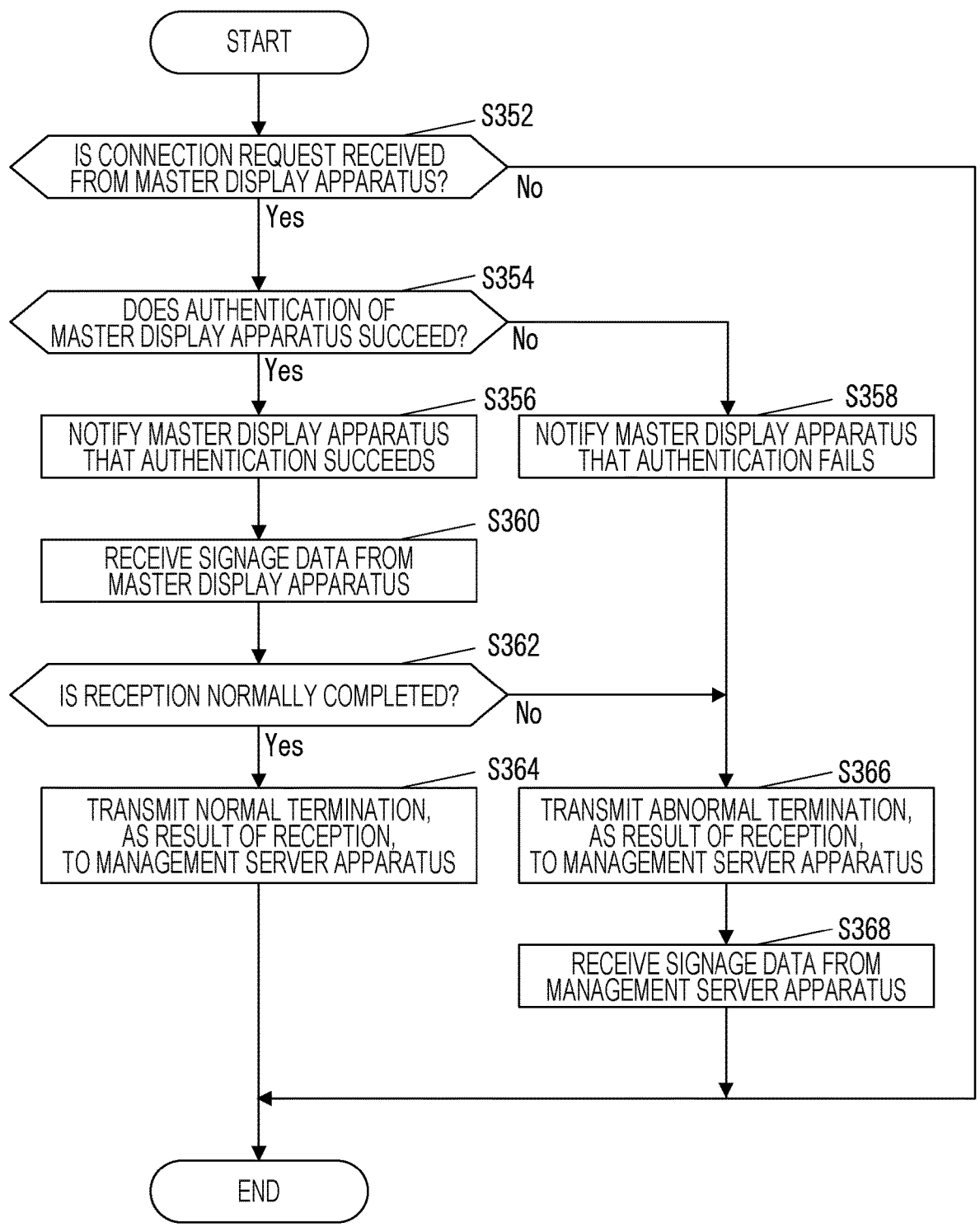
FIG. 13 is a flowchart for describing signage data reception processing by the slave display apparatus in the first embodiment.

Subsequently, the slave display apparatus 24 performs processing that receives the signage data from the master display apparatus 22 or the management server apparatus 10 (Step S306). This processing is referred to as slave display apparatus signage data reception processing, and the detail thereof is described with reference to FIG. 13.

First of all, it is determined whether or not the connection request is received from the master display apparatus 22 (Step S352). In a case where the connection request is not received, the present processing is terminated (No in Step S352).

Subsequently, in a case where the connection request is received from the master display apparatus 22, the master display apparatus 22 is authenticated based on the authentication information that is transmitted along with the connection request and the connection request (Step S354). Specifically, it is determined whether or not the IP address and the port number of the master display apparatus 22 that is the connection source are matched with the IP address and the port number that are stored in the master information 334, and whether or not the password that is included in the connection request is correct. If the result of the determination described above is true, the master display apparatus 22 that is the connection source of the connection request is regarded a legitimate master display apparatus 22, and thus the authentication is set to succeed. In a case where the result of the determination is false, such as when the password is wrong, the authentication is set to fail.

In a case where the authentication of the master display apparatus 22 succeeds, the master display apparatus 22 that is the transmission source of the connection request is notified that the authentication succeeds (if the result is Yes in Step S354, proceeding to Step S356 takes place). On the other hand, in a case where the authentication fails, the master display apparatus 22 that is the transmission source of the connection request is notified that the authentication fails (if the result is No in Step S354, proceeding to Step S358 takes place), and a signage reception notification that the result of the reception is abnormal termination is transmitted to the management server apparatus 10 (proceeding from Step S358 to Step S366 takes place).

In a case where the master display apparatus 22 is notified that the authentication succeeds, the signage data that is distributed from the master display apparatus 22 is subsequently received and is stored in the signage data storage area 332 (Step S360). Subsequently, it is determined whether or not the reception of the signage data is normally terminated, and the signage data reception notification that the result of the reception is the normal termination is transmitted to the management server apparatus 10 (if the result is Yes in Step S362, proceeding to Step S364 takes place). In a case where the normal termination is not performed, the signage data reception notification that the result of the reception is the normal termination is transmitted to the management server apparatus 10 (if the result is No in Step S362, proceeding to Step S366 takes place).

The transmission of the signage reception notification is performed based on the management server information 336. In the present embodiment, the IP address of the management server apparatus 10 is stored as the management server information 336. Because of this, the signage reception notification is transmitted with the IP address as the transmission destination.

Furthermore, as the case where the reception of the signage data is not normally terminated, in addition to a case where the master display apparatus 22 described above is difficult to authenticate, a case where a failure occurs while the reception of the signage data is in progress and thus the timeout expires along the way, or a case where the signage data that has to be distributed is difficult to receive correctly is considered.

In a case where the reception of the signage data is not normally terminated, after the signage data reception notification that the result of the reception is the abnormal termination is transmitted, the signage data that is distributed from the management server apparatus 10 is received and is stored in the signage data storage area 332 (Step S368). It is noted that when receiving the signage data from the management server apparatus 10, the connection information of the management server apparatus 10 may be verified based on the management server information 336. The connection information of the management server apparatus 10 is verified and thus the security can be ensured.

With the processing described above, the slave display apparatus 24 verifies the legitimacy of the master display apparatus 22, and then can receive the signage data. Furthermore, even in a case where the signage data is difficult to receive from the master display apparatus 22, the signage data can be received from the management server apparatus 10.

With reference back to FIG. 12, subsequently, the content can be display-controlled (Step S308). That is, the content that is stored in the signage data storage area 332 is display-controlled. At this time, in the case where the schedule data or the layout data is included in the signage data storage area, the display of the content data is performed based on the schedule data or the layout data.

1.4 Flow for the Entire Processing

Figure 14:
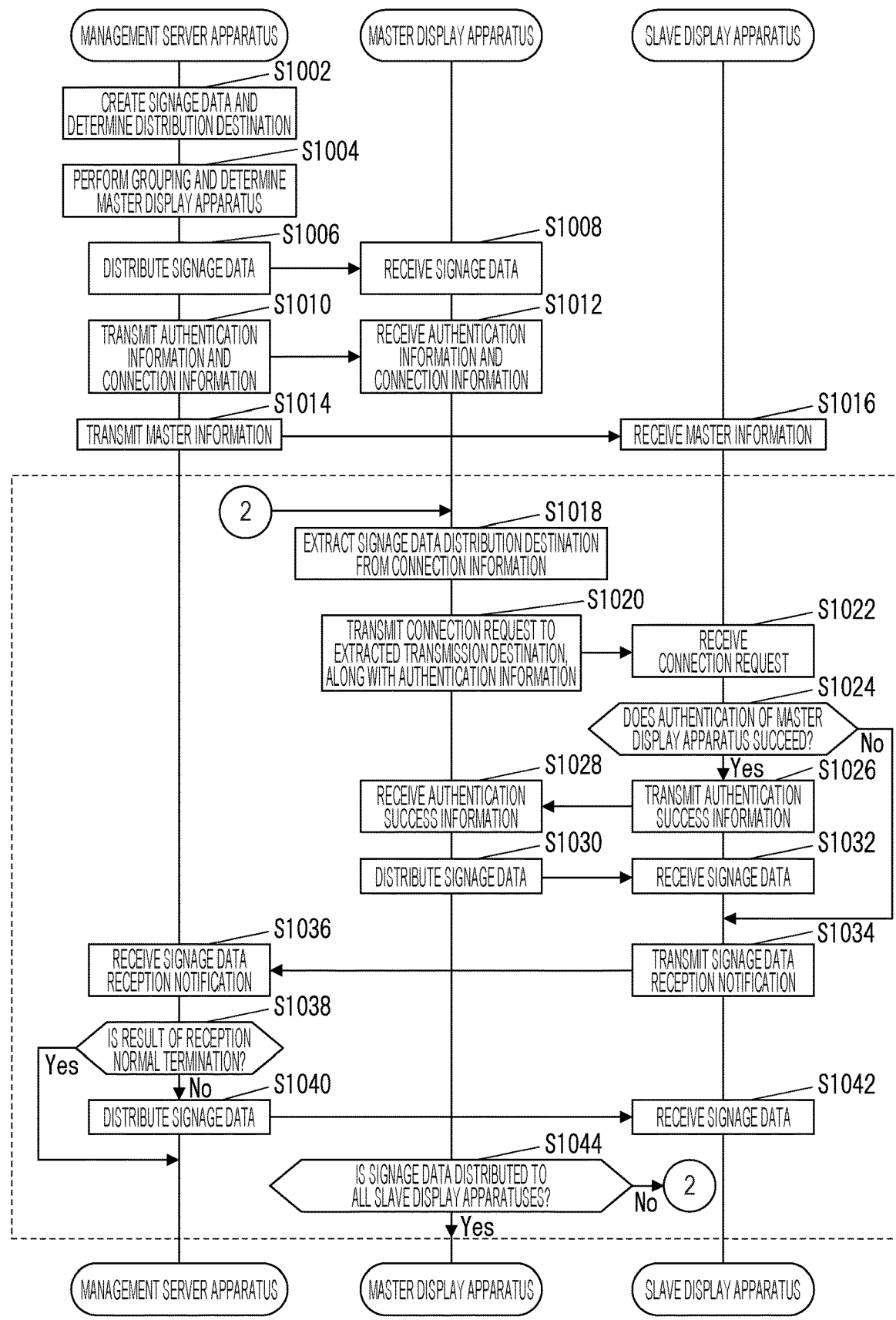
FIG. 14 is a diagram for describing a sequence in the first embodiment.

Subsequently, a flow for the entire processing according to the present embodiment is described with reference to FIG. 14. FIG. 14 is a sequence diagram illustrating processing by the management server apparatus 10, processing by the master display apparatus 22, and processing by the slave display apparatus 24.

First, in the management server apparatus 10, signage data is created and the display apparatus that is the distribution destination of the created signage data is determined (S1002). That is, the management of the digital signage system 1, or the like stores the signage data in the signage data storage area 122, and determined the display apparatus 20 that is set to be the distribution destination of the stored signage data.

Subsequently, based on the distribution destination, the grouping is performed, and the master display apparatus 22 is determined for every group (S1004). In the present embodiment, the display apparatuses 20 that distribute the same signage data are grouped, and the master display apparatus 22 is determined from the display apparatuses that belong to a group. It is noted that the display apparatus 20 that is not the master display apparatus 22 in a group is set to be the slave display apparatus 24.

Subsequently, the signage data is distributed to the master display apparatus 22 that is determined in S1004 (S1006). The master display apparatus 22 that receives the signage data stores the received signage data in the signage data storage area 232 (S1008).

Moreover, the authentication information 130 and the connection information 132 are transmitted to the master display apparatus 22 that is determined in Step S1004 (S1010), and the master display apparatus 22 receives the authentication information 130 and the connection information 132 and stores the received authentication information 130 and connection information 132, as the authentication information 234 and the connection information 236, respectively (S1012).

Furthermore, the management server apparatus 10 transmits the master information 128 to the slave display apparatus 24 (S1014). The slave display apparatus 24 receives the master information 128 (S1016), and stores the received master information 128 as the master information 334.

Subsequently, based on the connection information that is received in S1012, the master display apparatus 22 distributes the signage data that is received in S1008, to the slave display apparatus 24 within the group.

First, the master display apparatus 22 extracts one slave display apparatus 24 that does not yet distribute the signage data, from the connection information that is received in S1012 (S1018). Furthermore, regarding the slave display apparatus 24, authentication information on the slave display apparatus 24 is extracted from the authentication information 234. Subsequently, based on the connection information, the connection information is transmitted with the authentication information (S1020).

Regarding the display apparatus that is a transmission source of the connection request, the slave display apparatus that receives the connection request (S1022) determines whether match with the connection information, such as the IP address or the port number, that is received in S1016, takes place, and whether or not the authentication information such as the password is correct. Based on the result of the determination, the authentication of the master display apparatus 22 that is the transmission source is performed.

In a case where the authentication succeeds, authentication success information indicating that the authentication succeeds is transmitted to the master display apparatus 22 that is the connection source (S1026). Furthermore, the master display apparatus 22 that receives the authentication success information (S1028) transmits the signage data to the slave display apparatus 24 that succeeds in authentication (S1030). The slave display apparatus 24 receives the signage data (S1032), and stores the received signage data in a signage data storage area 342.

Subsequently, the slave display apparatus 24 transmits the signage data reception notification, which includes information as to whether the reception of the signage data is correctly terminated, to the management server apparatus 10 (S1034). In the present embodiment, in a case where the reception of the signage data can be correctly terminated, the result of the reception is set to be the "normal termination", and in a case where the reception of the signage data is difficult to terminate correctly, that is, in a case where the distribution fails, the result of the reception is set to be the "abnormal termination".

Subsequently, the management server apparatus 10 that receives the signage data reception notification determines whether or not the result of the reception is the normal termination (proceeding from S1036 to S1038 takes place). In a case where the result of the reception is not the normal termination (in the case of the abnormal termination), the management server apparatus 10 distributes the signage data to the slave display apparatus 24 that transmits the signage data reception notification (S1040). The slave display apparatus 24 receives the signage data (S1042), and stores the stored signage data in the signage data storage area 342.

Even in a case where the reception of the signage data from the master display apparatus 22 is difficult to terminate normally, with the processing described, the slave display apparatus 24 has difficulty in receiving the signage data from the management server apparatus 10. Therefore, the distribution of the signage data can be made to be more reliable.

Subsequently, the master display apparatus 22 determines whether or not the signage data is distributed to all the slave display apparatus 24 within the group (S1044). In a case where the signage data is not distributed to all the slave display apparatus 24 within the group, processing is performed from S1018 up to S1042 (if the result is No in Step S1044, proceeding to Step S1018 takes place). In a case where the signage data is distributed to all the slave display apparatus 24 within the group, the processing is terminated.

The processing that distributes the signage data from the master display apparatus 22 to the slave display apparatus 24, which is described above, that is, the processing from S1018 up to S1044 in FIG. 14, is hereinafter referred to as "intra-group distribution processing". With the intra-group distribution processing, the master display apparatus 22 can distribute the signage data to the slave display apparatus 24 that belongs to the group.

Figure 15:
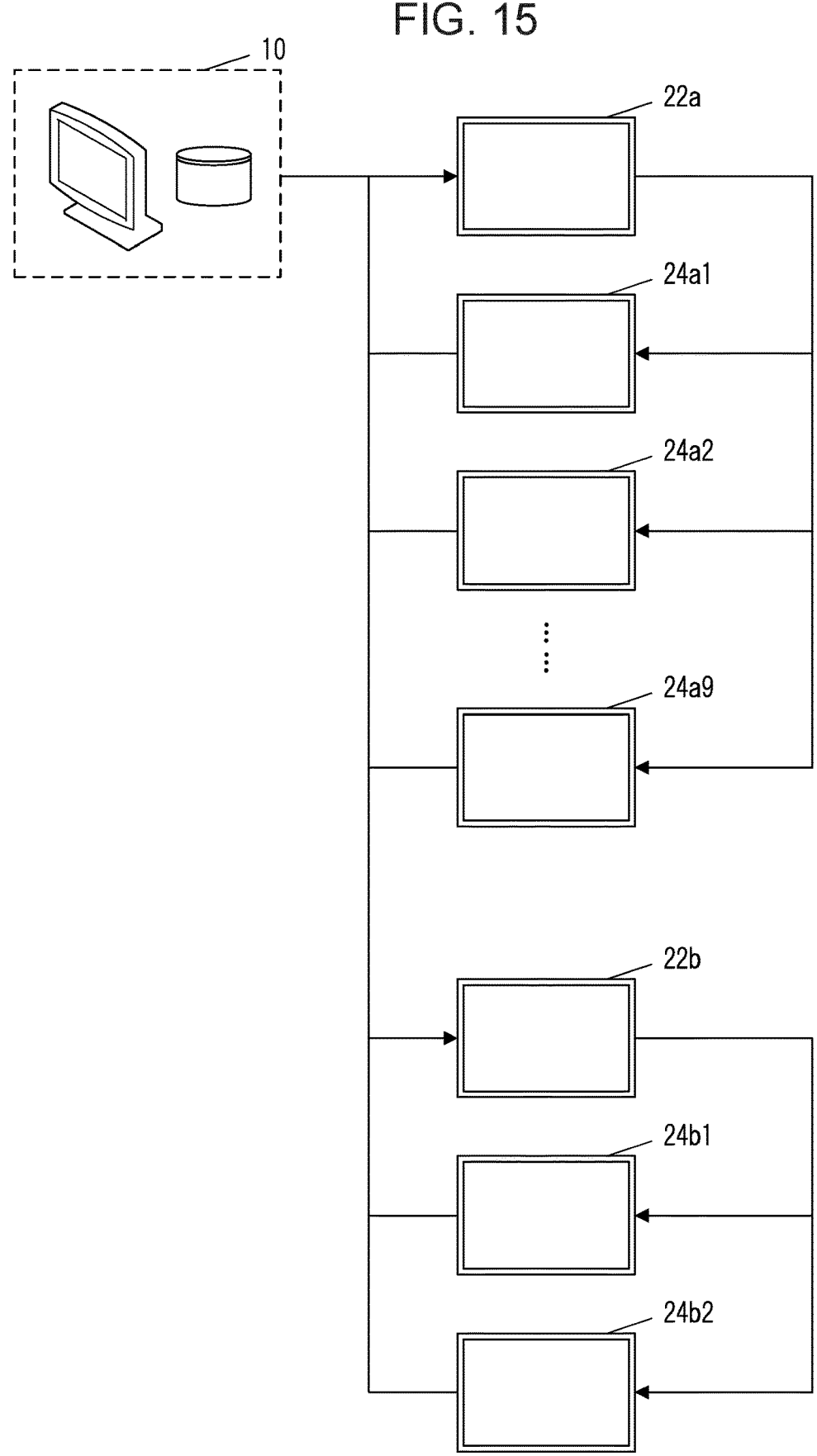
FIG. 15 is a diagram for describing a conception in the first embodiment.

1.5 Example of an Operation 1.5.1 Example of an Operation of Distributing Signage Data An example of an operation of distributing signage data in the present embodiment is described with reference to FIG. 15. In FIG. 15, it is illustrated that one management server apparatus 10 and a plurality of display apparatuses 20 are connected. At this point, it is assumed that, based on the signage data that is distributed, two groups are available. Furthermore, a display apparatus 22a and the display apparatus 22b are set to be determined as the master display apparatuses 22 within the groups, respectively.

The management server apparatus 10 distributes pieces of signage data that correspond to the groups, respectively, to the master display apparatus 22a and a master display apparatus 22b. The master display apparatus 22a that receives the signage data distributes the signage data to slave display apparatuses 24a1 to 24a9. Furthermore, in the same manner, the master display apparatus 22b that receives the signage data distributes the signage data to a slave display apparatus 24b1 and a slave display apparatus 24b2.

In this manner, the management server apparatus 10 and the master display apparatuses 22a and 22b distributes the signage data, and thus it is possible that the signage data is distributed to all the display apparatuses 20 which are illustrated in FIG. 15.

1.5.2 Example of Screen Display

Figure 16A:
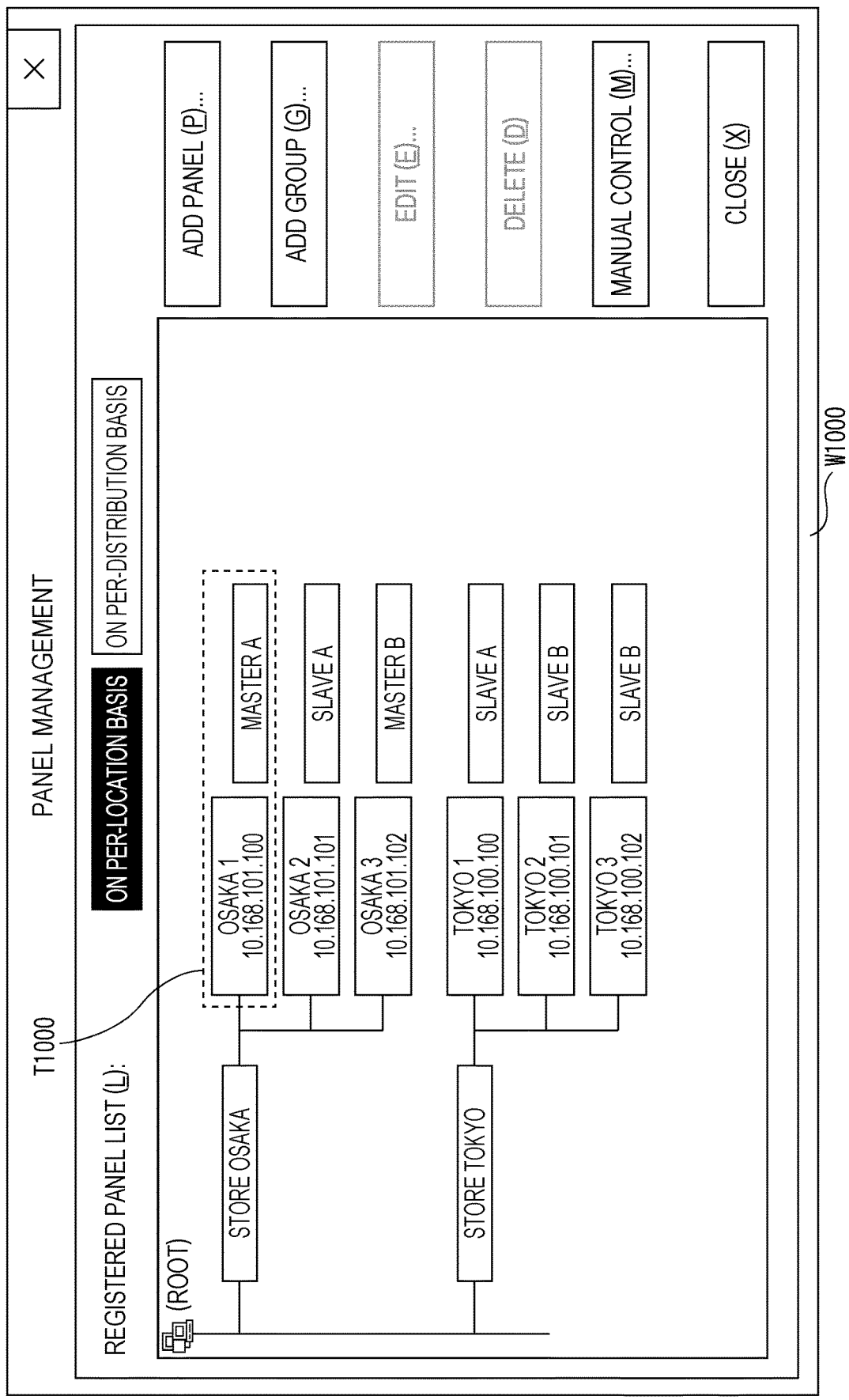
FIGS. 16A and 16B are diagrams for describing examples, respectively, of a screen on which a situation of grouping in the first embodiment is displayed on a per-location basis and a screen on which the situation of grouping in the first embodiment is displayed on a per-distribution basis.
Figure 16B:
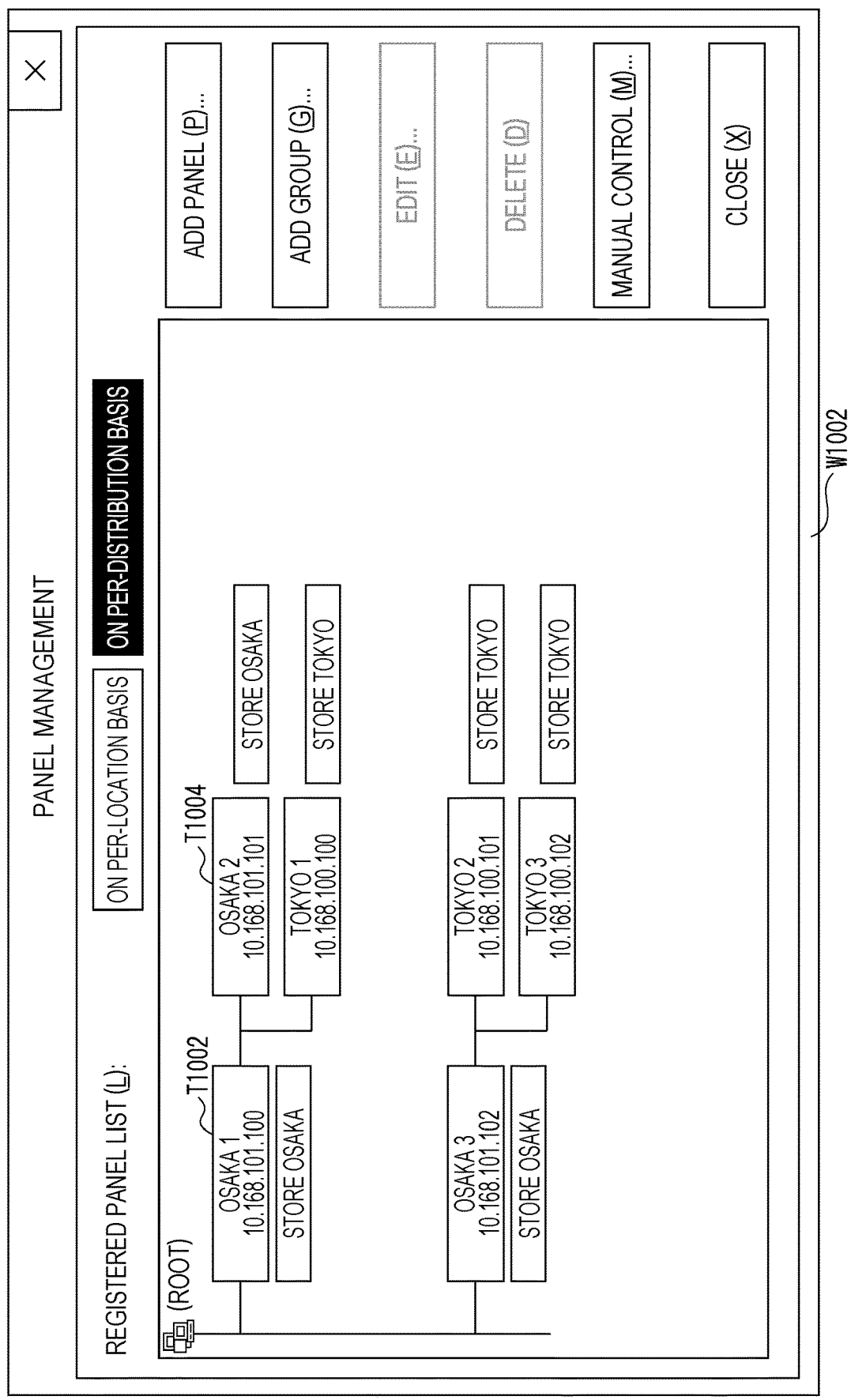

An example of screen display in the management server apparatus 10 according to the present embodiment is described with reference to FIGS. 16A and 16B. FIGS. 16A and 16B each illustrate the examples of the screen display, in which the state where display apparatuses 20 that are managed by the management server apparatus 10 are grouped is displayed on a display or the like which is connected to the management server apparatus 10.

FIG. 16A is a diagram of a display screen W1000 on which the display apparatus 20 is displayed on a per-location basis, based on the location that is the attribute of the display apparatus 20. Information on the display apparatus 20 is displayed in the form of a tree structure on the display screen W1000 based on the location, and this display refers to location-based display. For example, it is illustrated that the display apparatus 20 that is displayed on T1000 is a master display apparatus that has the display apparatus name "OSAKA 1", and the location attribute "STORE OSAKA", and represents the group "A". Furthermore, the location attribute may be stored as an attribute of the display apparatus information 124.

FIG. 16B is a diagram of a display screen W1002 on which a relationship between the master display apparatus 22 and the slave display apparatus 24 for every group is displayed. The information on the display apparatus 20 is displayed in the form of a tree structure on the display screen W1002 based on the location, and this display refers distribution-based display. At this point, the display apparatus 20 that is a slave element on a root is the master display apparatus 22, and the display apparatus 20 that is a slave element of the master display apparatus 22 is the slave display apparatus 24. For example, it is illustrated that the display apparatus 20 which is a slave element and is identified with "OSAKA 1" is the master display apparatus 22, and that the signage data is distributed to the slave display apparatuses 24 that are identified with "OSAKA 2" and "TOKYO 1". It is noted that an attribute such as the location may be displayed in the vicinity of the display apparatus name.

Furthermore, on the display screen W1000 and the display screen W1002, a situation where pieces of signage data are arranged may be identically displayed. For example, in the case of a state where the distribution of the signage data is awaited, or in a case where the distribution from the master display apparatus 22 is not normally terminated, the displaying is performed in a manner that changes a background color of the display apparatus name or a color of a letter. By performing identification display, a situation of the distribution of the signage data can be reported to the manager of the digital signage system 1, or the like, and in a case where a trouble with the distribution of the signage data, it is possible that the trouble is dealt with.

According to the embodiment described above, the PUSH-type distribution is possible in which creation signage data in the management server apparatus 10 triggers the distribution of the signage data to the master display apparatus 22 and the slave display apparatus 24.

Furthermore, based on a type of content that is to be distributed, display apparatuses can be grouped based on signage data. Moreover, based on the group, the management server apparatus 10 can distribute the signage data to the master display apparatus 22 in each group, and the master display apparatus 22 can distribute the signage data to the slave display apparatus 24. Therefore, the management server apparatus 10 may transmit the signage data and information desirable for the distribution to the master display apparatus 22, and the likelihood that congestion will occur in a network on the management display apparatus 10 side is decreased. Moreover, because the management server apparatus 10 does not need to distribute the signage data to all the display apparatuses 20, it is possible that the time from when the distribution is started to when the distribution is completed is shortened.

Furthermore, the slave display apparatus 24 accepts only the distribution from the master display apparatus 22 based on the master information. Therefore, even if there is no distribution from the management server apparatus 10, in a state where the security is ensured, it is possible that the distribution is accepted.

Moreover, even in a case where the slave display apparatus 24 fails in the distribution of the signage data from the master display apparatus 22, the slave display apparatus 24 can directly distribute the signage data directly from the management server apparatus 10 to the slave display apparatus 24. With this processing, a failure, such as a failure in the distribution of the signage data to the slave display apparatus, can be kept from occurring.

In this manner, because the group is configured based on the signage data that is to be distributed, the signage data can be efficiently distributed without revising a hardware configuration requirement, or the like. Furthermore, features of the digital signage system also include one in which the display apparatus 20 that distributes the signage data will be unlawfully by the third party in a place that is at some distance away from the management server apparatus 10 and is beyond the reach of the control. Even in this case, with the authentication of the master display apparatus 22 by the slave display apparatus 24 or with the distribution of the signage data from the management server apparatus 10 to the slave display apparatus 24, it is possible that the distribution of the signage data is made to be more reliable.

2. Second Embodiment

Subsequently, a second embodiment is described. The second embodiment has the same entire configuration and functional configuration as the first embodiment, but performs PULL type distribution in which the reception of a distribution request from the master display apparatus 22 and the slave display apparatus 24 by the management server apparatus 10 triggers the distribution of the signage data.

The present embodiment has the same entire configuration and function configuration as the first embodiment, and thus descriptions thereof are omitted. Furthermore, according to the present embodiment, a sequence for processing and a flow for processing, which are illustrated in FIGS. 9 to 14 in the first embodiment are replaced with a sequence for processing and a flow for processing, respectively, which are illustrated in FIGS. 17 to 21. In figures that illustrate the sequence for processing and the flow for processing, the same processing as in the first embodiment is given the same numeral reference as in the first embodiment, and a description thereof is omitted.

Figure 17:
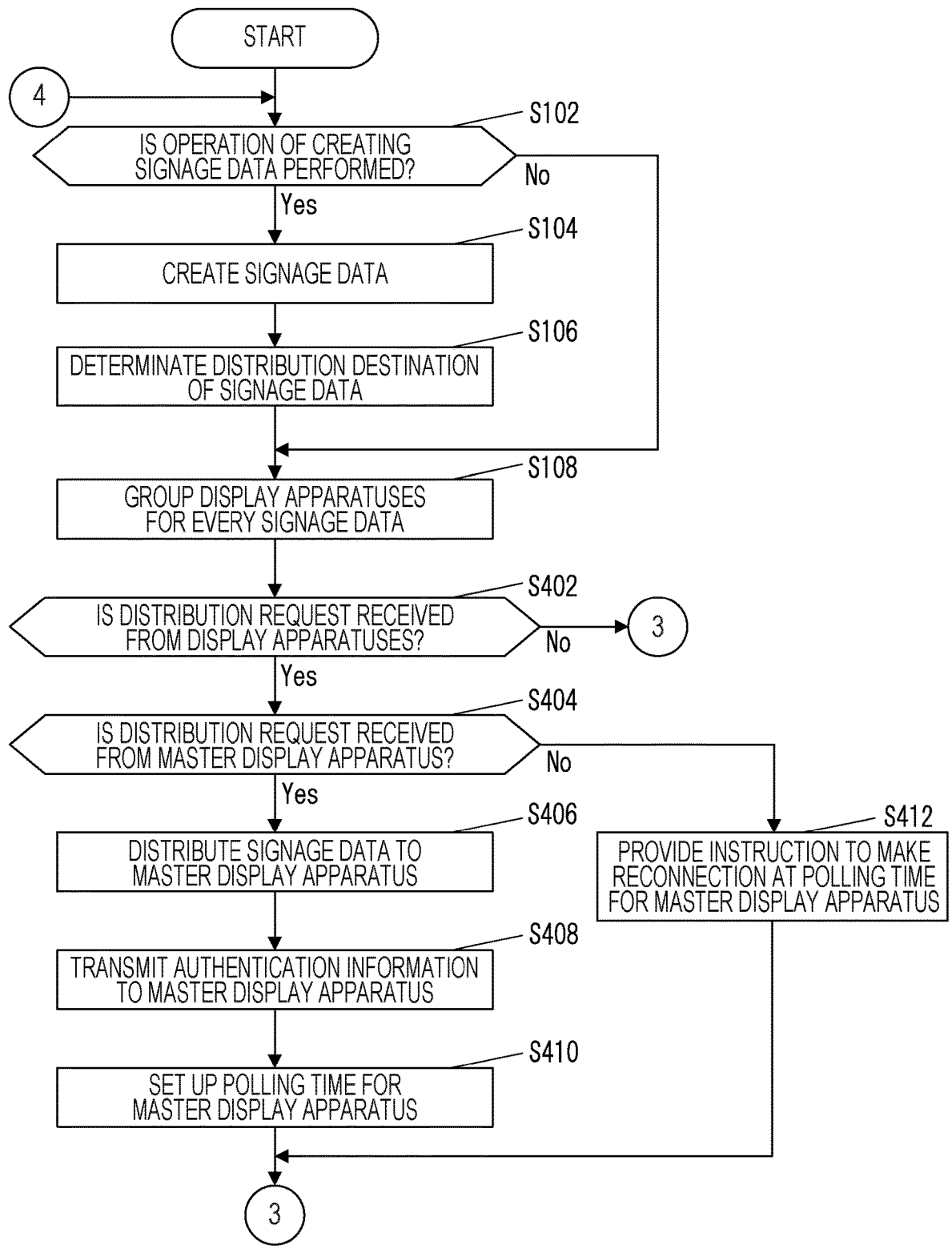
FIG. 17 is a flowchart for describing processing by a management server apparatus in a second embodiment.
Figure 18:
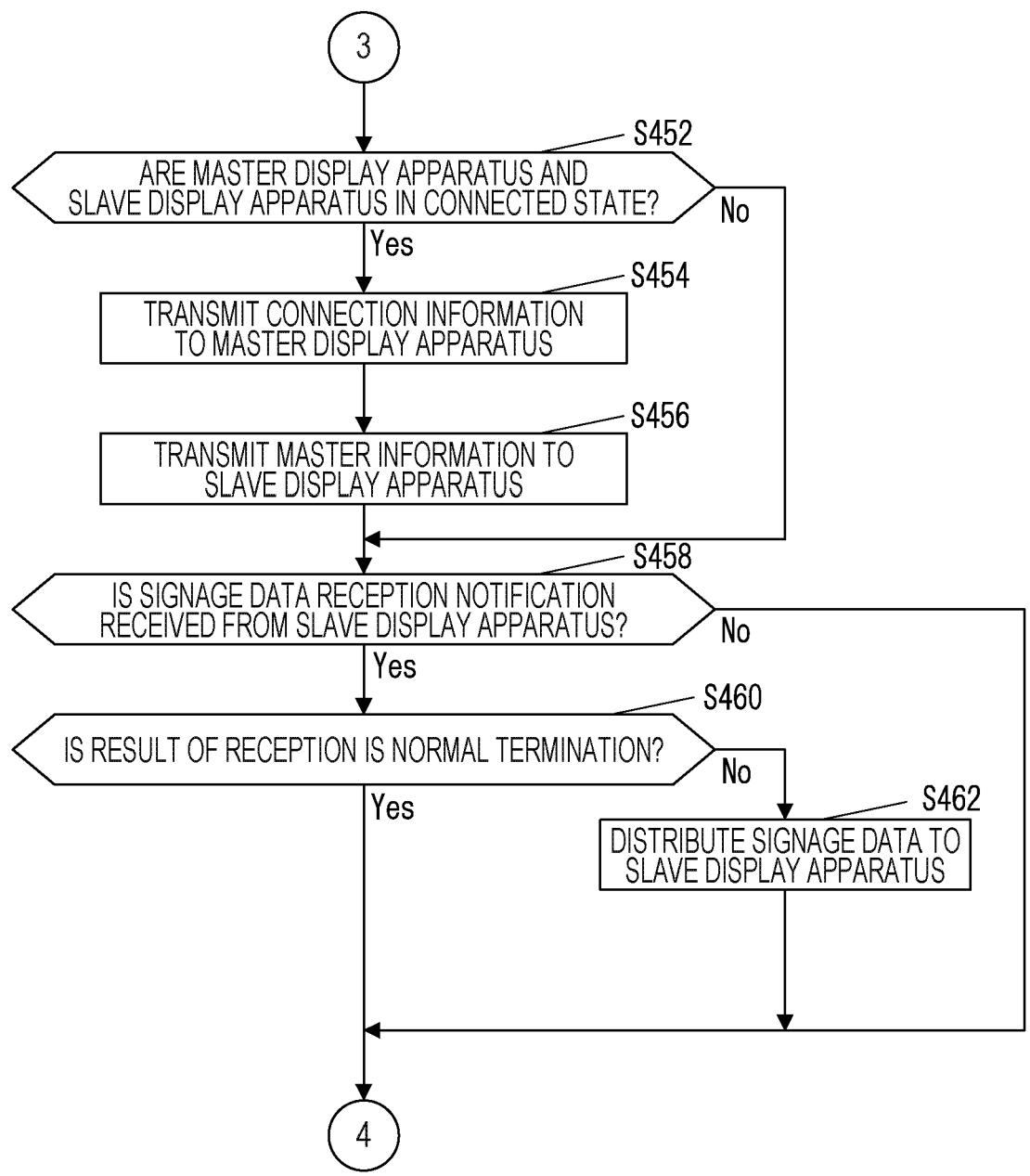
FIG. 18 is a flowchart for describing the processing by the management server apparatus in the second embodiment.

2.1 Flow for Processing by Every Apparatus 2.1.1 Processing by the Management Server Apparatus Processing by the management server apparatus 10 is described with reference to FIGS. 17 and 18. First of all, signage data is created and the display apparatuses 20 are grouped for every signage data that is to be distributed (proceeding to Step S102, Step S104, Step S106, and Step S108 in this order takes place). The processing is the same as in the first embodiment.

Subsequently, it is determined whether or not the distribution request is received from the display apparatus 20. The distribution request refers to a request that is made by the display apparatus 20 to the management server apparatus 10 for the distribution of the signage data. In a case where the distribution request is not received, processing in Step S452 is performed (if the result is No in Step S402, proceeding to Step S452 takes place).

In a case where the distribution request is received, subsequently, it is determined whether or not the distribution request is received from the master display apparatus 22 (proceeding from Step S402 to Step S404 takes place). The determination of whether or not the distribution request is received from the master display apparatus 22 is made specifically with a method that will be described.

(1) It is determined that, among the display apparatuses 20 within the group, the display apparatus 20 that first transmits the distribution request is the master display apparatus 22. At this time, information on the display apparatus is stored in the master information 128.

(2) In a case where the distribution request is received from, the display apparatus 20 that is stored in the master information 128, it is determined that the distribution request is received from the master display apparatus 22.

That is, in order to group the display apparatus 20 in Step S108, among the display apparatuses that belong to the group, the management server apparatus 10 sets the display apparatus 20 that first transmits the distribution request, to be the master display apparatus 22, and manages the other display apparatuses as the slave display apparatuses 24. At this time, the management server apparatus 10 stores a group ID, a display apparatus name of the master display apparatus 22, and a connection information on the master display apparatus 22 in the master information 128. Furthermore, a group ID, display apparatus names of the slave display apparatuses 24, and passwords of the slave display apparatuses 24 are stored in the authentication information 130. Furthermore, the group ID, the display apparatus names of the slave display apparatuses 24, and the passwords of the slave display apparatuses 24 are stored in the connection information 132.

It is noted that a plurality of master display apparatuses 22 may be provided within the group. For example, in a case where two master display apparatuses are set up to be within the group, the following processing is performed.

(1) Among the display apparatuses within the group, a display apparatus that first transmits the distribution request is set to be the master display apparatus 22.

(2) A display apparatus that transmits the distribution request is set to be the slave display apparatus 24 until the number of distribution requests reaches half of the number of display apparatuses within the group.

(3) A display apparatus that next transmits the distribution request is set to be the master display apparatus 22.

(4) A display apparatus that transmits the distribution request thereafter is set to be the slave display apparatus 24.

In a case where there are 100 display apparatuses 10 within the group, a display apparatus that is the first in transmitting the distribution request to the management server apparatus 10 is the master display apparatus 22, and display apparatuses that are the second to the 50th in transmitting the distribution request are the slave display apparatuses 24 that are represented by the master display apparatus 22. In the manner, in the management server apparatus 10, a display apparatus that is the 51st in transmitting the distribution request is the display apparatus 22, and display apparatuses that are the 52nd to 100th in transmitting the distribution request are the slave display apparatuses 24 that are represented by the master display apparatus 22.

Subsequently, in a case where the distribution request is received from the master display apparatus 22 (Yes in Step S404), the signage data is distributed to the master display apparatus 22 (Step S406), and the authentication information on the slave display apparatus 24 is transmitted (Step S408).

Furthermore, a polling time is set up for the master display apparatus 22 (Step S410). By setting up the polling time, the master display apparatus 22 can be caused to be periodically connected to the management server apparatus 10.

In a case where the distribution request is received from a display apparatus other than the master display apparatus 22, that is, the slave display apparatus 24, the master display apparatus 22 is instructed to make a reconnection at the polling time that is set up (if the result is No in Step S404, proceeding to Step S412 takes place). Therefore, even in a case where the distribution request is received from the slave display apparatus 24, the management server apparatus 10 does not perform the distribution of the signage data to the slave display apparatus 24. Instead of this, by instructing the slave display apparatus 24 to make a reconnection, the slave display apparatus 24 can be caused to make a connection to the management server apparatus 10 during a duration for which the master display apparatus 22 is connected based on the setting up of the polling time.

Subsequently, it is determined whether or not the master display apparatus 22 and the slave display apparatus 24 are connected at the same time (Step S452). If so, the following cases are considered.
(1) a case where the distribution request is received from the slave display apparatus 24 while the signage data is being distributed to the master display apparatus 22.
(2) a case where the master display apparatus 22 is connected to the management server apparatus 10 based on the polling time and where the slave display apparatus 24 is connected to the management server apparatus 10 based on the reconnection instruction.

In the case of (1), a state where the distribution request of the slave display apparatus 24 is maintained until the management server apparatus 10 finishes distributing the signage data to the master display apparatus 22, and at a stage where the management server apparatus 10 finishes distributing the signage data the signage data, the master display apparatus 22 and the slave display apparatus 24 that are connected to the management server apparatus 10 are determined as being in a connected state, that is, the result of the determination in Step S452 is set to be true.

For example, in the case of (2), if the connection request is received from the display apparatus 20, the connection is maintained for a given time (for example, one minute). Moreover, even in a case where the connection request is received from any other display apparatus 20, the connection is maintained in the same manner. The display apparatus 20 that maintains the connection after the given time elapsed is set to be the display apparatus 20 that is in the connected state. At this time, in a case where the display apparatuses 20 that are in the connected state include the master display apparatus 22 and the slave display apparatus 24, the result of the determination in Step S452 is set to be true.

When the processing in Step S452 is performed, in a case where a connection from the display apparatus 20 is made, the management server apparatus 10 acquires the connection information on the display apparatus 20 that is connected, and the connection information on the display apparatus 20 is updated with the latest one. That is, in a case where the connection from the master display apparatus 22 is made, the IP address and the port number of the master display apparatus 22 in the master information 128 are updated with the latest one. Furthermore, in a case where the connection from the slave display apparatus 24 is made, the IP address and the port number of the slave display apparatus 24 in the connection information 132 are updated with the latest ones.

Subsequently, the management server apparatus 10 transmits the connection information 132 on the slave display apparatus 24 that belongs to the same group as the master display apparatus 22, to the master display apparatus 22 (Step s454). Furthermore, the master information 128 on the master display apparatus 22 that belongs to the same group as the slave display apparatus 24 is transmitted to the slave display apparatus 24 (Step S456). As described above, because the master information 128 and the connection information 132 on the management server apparatus 10 are updated with the latest connection information, it is possible that the master display apparatus 22 distributes the signage data to the slave display apparatus 24.

Subsequently, it is determined whether or not the signage data reception notification is received from the slave display apparatus 24 (Step S458). In a case where the signage data reception notification is received, it is determined whether or not a result of the reception processing of the signage is normally terminated in the slave display apparatus 24. If the result of the reception is the norm termination, returning to Step S102 takes place (if the result is Yes in Step S460, proceeding to Step S102 takes place). In a case where the result of the reception is not the normal termination, the signage data is distributed to the slave display apparatus 24, and then returning to Step S102 takes place (if the result is No in Step; S460, proceeding to Step S462 and Step S102 in this order takes place).

It is noted that in the same manner as in the first embodiment, the distribution of the signage data from the management server apparatus 10 to the slave display apparatus 24 may be set to be the distribution that is based on the reception of the signage data distribution request which is transmitted from the slave display apparatus 24.

2.1.2 Processing by the Master Display Apparatus

Figure 19:
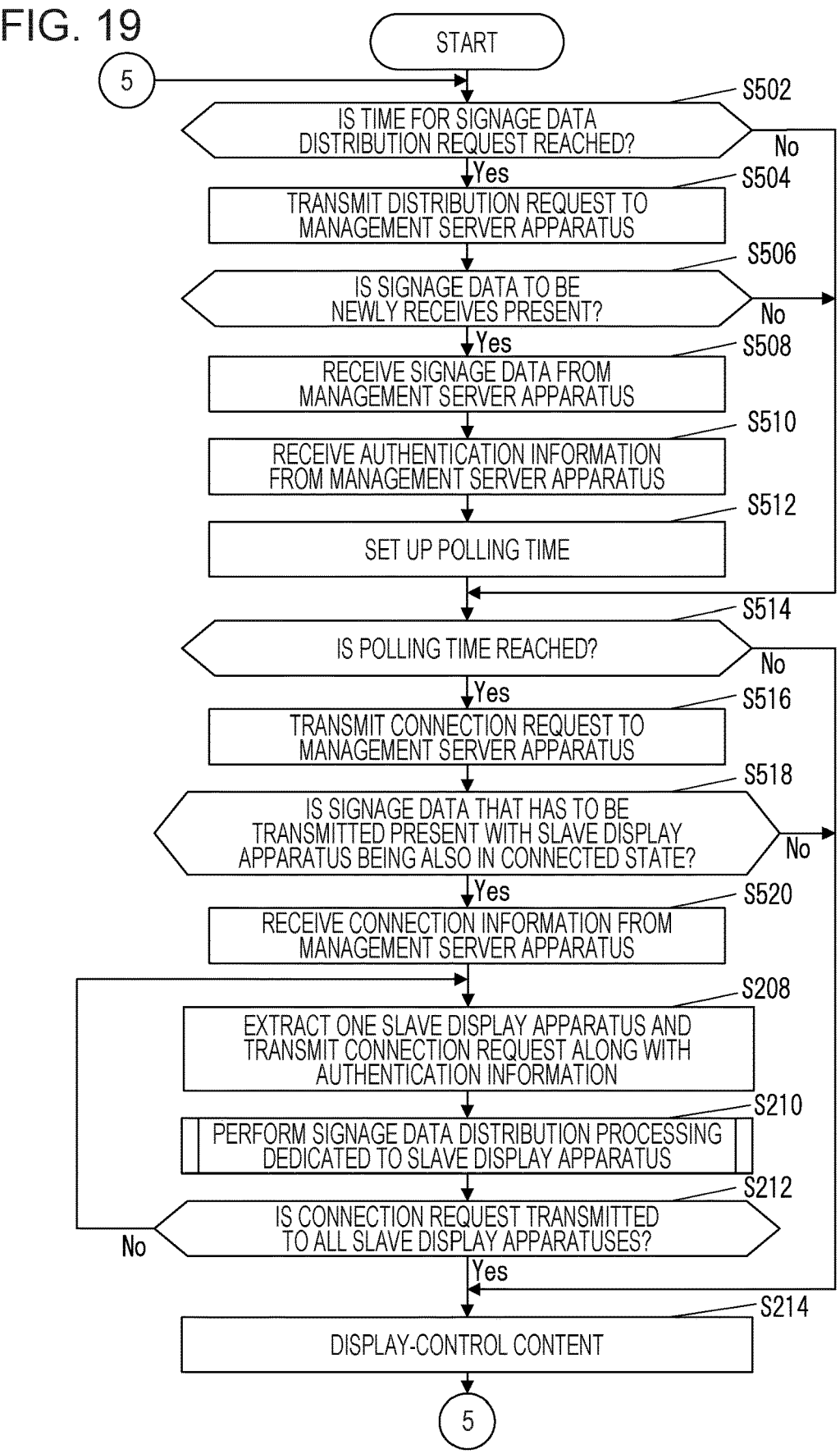
FIG. 19 is a flowchart for describing processing by a master display apparatus in the second embodiment.

Processing by the master display apparatus 22 is described with reference to FIG. 19. First of all, it is determined whether or not the time for the signage data distribution request is reached. The time for the signage data distribution request refers to the time to transmit the request for the signage data distribution to the management server apparatus 10. The present embodiment is different from the first embodiment in that although the signage data that is stored in the management server apparatus 10 is created or updated, the signage data is not distributed. Therefore, on the display apparatus 20 side, there is a need to check whether or not the signage data that is stored in the management server apparatus 10 is updated.

As the time for the signage data distribution request, the following is considered.

(1) When the display apparatus is initially activated.
(2) when an instruction to transmit the distribution request is provided by the manager or the like.
(3) When a point in time that is set up as the time to check the signage data is reached.

Regarding (3), it is also possible that the signage data is periodically checked. Specifically, by setting up the time for the signage data distribution request for every one hour after the initial activation time, it can be checked every one hour whether or not the signage data is updated.

If the time for the signage data distribution request is reached, the distribution request is transmitted to the management server apparatus 10 (if the result is Yes in Step S502, proceeding to Step S504 takes place). Subsequently, it is determined whether or not signage data to be newly received from the management server apparatus 10 is present (Step S506). This determination, for example, may be a determination of whether or not the signage data that is stored in the management server apparatus 10 is matched with the signage data that is stored in the signage data storage area 232, and may be a determination of whether or not match with the attribute, such as a time stamp or a sequence number of the signage data, take place. Furthermore, a flag indicating whether or not the signage data is updated may be stored in the management server apparatus 10 and the determination may be made with a state of the flag.

Subsequently, in a case where the signage data to be newly received is present, the signage data is received from the management server apparatus 10, and the received signage data is stored in a signage data storage area (if the result is Yes in Step S506, proceeding to Step S508 takes place). Furthermore, the authentication information that is transmitted from the management server apparatus 10 is received (Step S510). Moreover, the polling time that is set up by the management server apparatus 10 is also set up in the master display apparatus 22 (Step S512).

Subsequently, in a case where a timing, that is, the polling time that is set up, is reached, the master display apparatus 22 transmits the connection request to the management server apparatus 10 (if the result is Yes in Step S514, proceeding to Step S516 takes place). At this time, in a case where the slave display apparatus 24 is also in a state of being connected to the management server apparatus 10 and where signage data that has to be distributed is present in the management server apparatus 10, in order to distribute the signage data to the slave display apparatus 24, the connection information on the slave display apparatus 24 is received from the management server apparatus 10 (if the result is Yes in Step S518, proceeding to Step S520 takes place).

At this point, the determination of whether or not the master display apparatus 22 and the slave display apparatus 24 are in the connected state is possible by determining whether or not the connection information on the slave display apparatus 24 is received from the management server apparatus 10. That is, in Step S452 in FIG. 18, if the master display apparatus 22 and the slave display apparatus 24 are in the connected state, because the connection information on the slave display apparatus 24 is transmitted from the management server apparatus 10 to the master display apparatus 22, it is possible that a determination is made according to a response of a management server apparatus 10 to the connection request in Step S516.

Subsequently, based on the authentication information that is received in Step in S510 and the connection information that is received in Step S520, one slave display apparatus 24 is extracted from the connection information, and signage data display processing dedicated to the slave display apparatus is performed. With the processing described above, it is possible that the master display apparatus 22 receives the signage data and distributes the signage data to the slave display apparatus 24. Furthermore, if the distribution of the signage data to the slave display apparatus 24 is completed, the content display control is performed.

2.1.3 Processing by the Slave Display Apparatus

Figure 20:
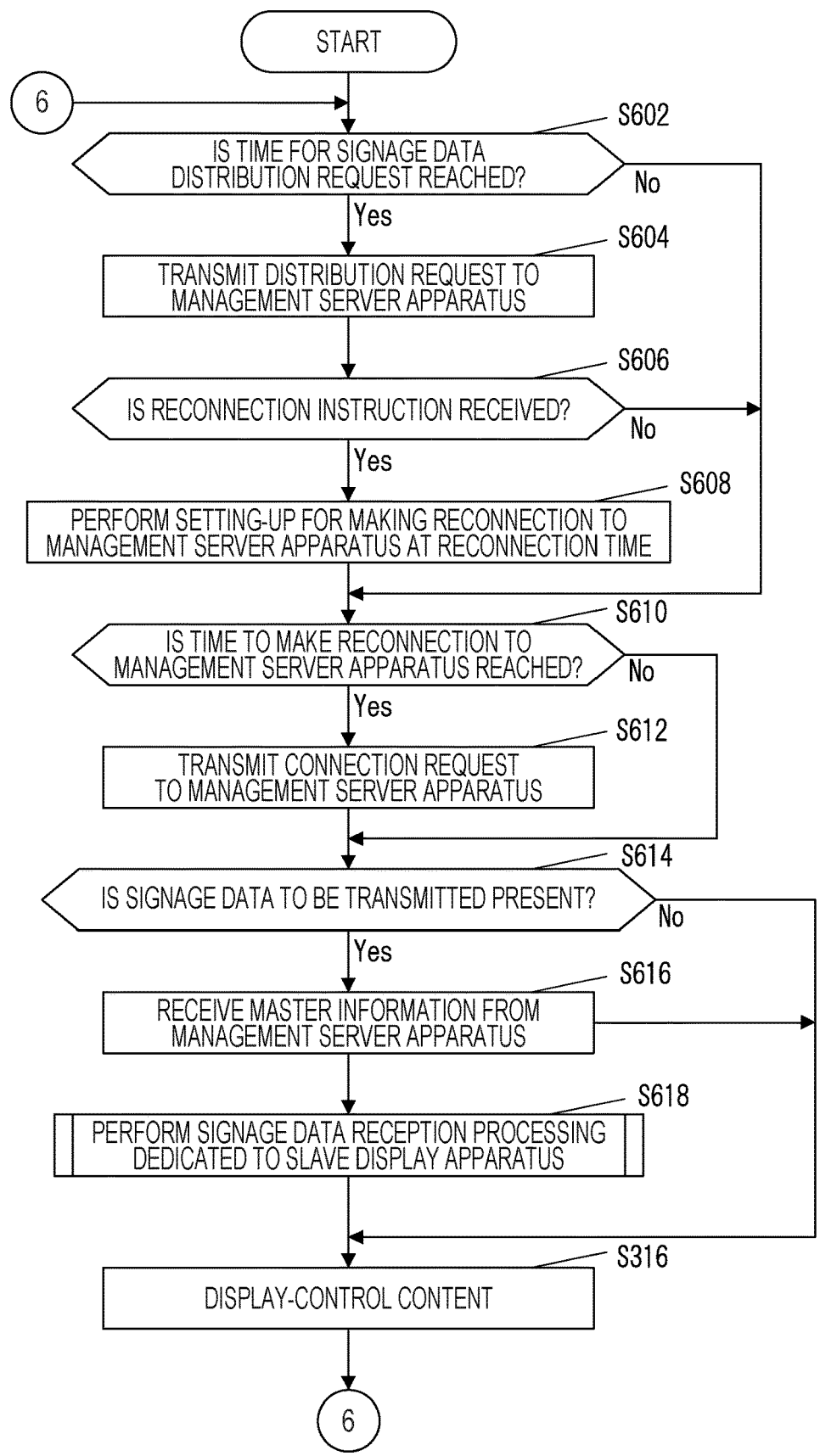
FIG. 20 is a flowchart for describing processing by a slave display apparatus in the second embodiment.

Processing by the slave display apparatus 24 is described with reference to FIG. 20. First of all, it is determined whether or not the time for the signage data distribution request is reached, and of the time for the signage data distribution request is reached, the distribution request is transmitted to the management server apparatus 10 (if the result is Yes in Step S602, proceeding to Step S604 takes place). The time for the signage data distribution request refers to the time to transmit the request for the signage data distribution to the management server apparatus 10. Furthermore, the specific processing operations in Step S602 and Step S604 are the same as those in Step S502 and Step S504, respectively, in the master display apparatus 22.

Subsequently, it is determined that a reconnection instruction, is received from the management server apparatus 10, and in a case where that the reconnection instruction is received, the reconnection to the management server apparatus is set up at a time (a reconnection time) at which the reconnection is made (If the result is Yes in Step S606, proceeding to Step S608 takes place). As the set-up for the reconnection, for example, the storing of the reconnection time in a storage unit 340 is considered.

Subsequently, it is determined whether or not the time to make a reconnection to the management server apparatus 10 is reached, and if the time to make the reconnection is reached, the connection request is transmitted to the management server apparatus 10 (if the result is Yes in Step S610, proceeding to Step S612 takes place). The determination of whether or not the time to make the reconnection to the management server apparatus 10 is reached, for example, the reconnection time that is stored in the storage unit 340 and a current point in time are compared with each other, and in a case where the current point in time is later than the reconnection time, it is determined that the time to make the reconnection to the management server apparatus 10 is reached.

Subsequently, it is determined whether or not the signage data that is to be distributed is present (Step S614). The determination, as described with reference to Step S506, may be made based on the identity or the attribute of the signage data that is stored in each of the management server apparatus 10 and the slave display apparatus 24, or may be made with the flag that is stored in the management server apparatus 10.

In a case where the signage data that is to be distributed is present, the master information that is transmitted from the management server apparatus 10 is received, and is stored as master information 344 (if the result is Yes in Step S614, proceeding to Step S616 takes place). Subsequently, the data reception processing by the slave display apparatus is performed (Step S618), and the content display control is performed based on the received signage data (Step S316).

2.2 Flow for the Entire Processing

Figure 21:
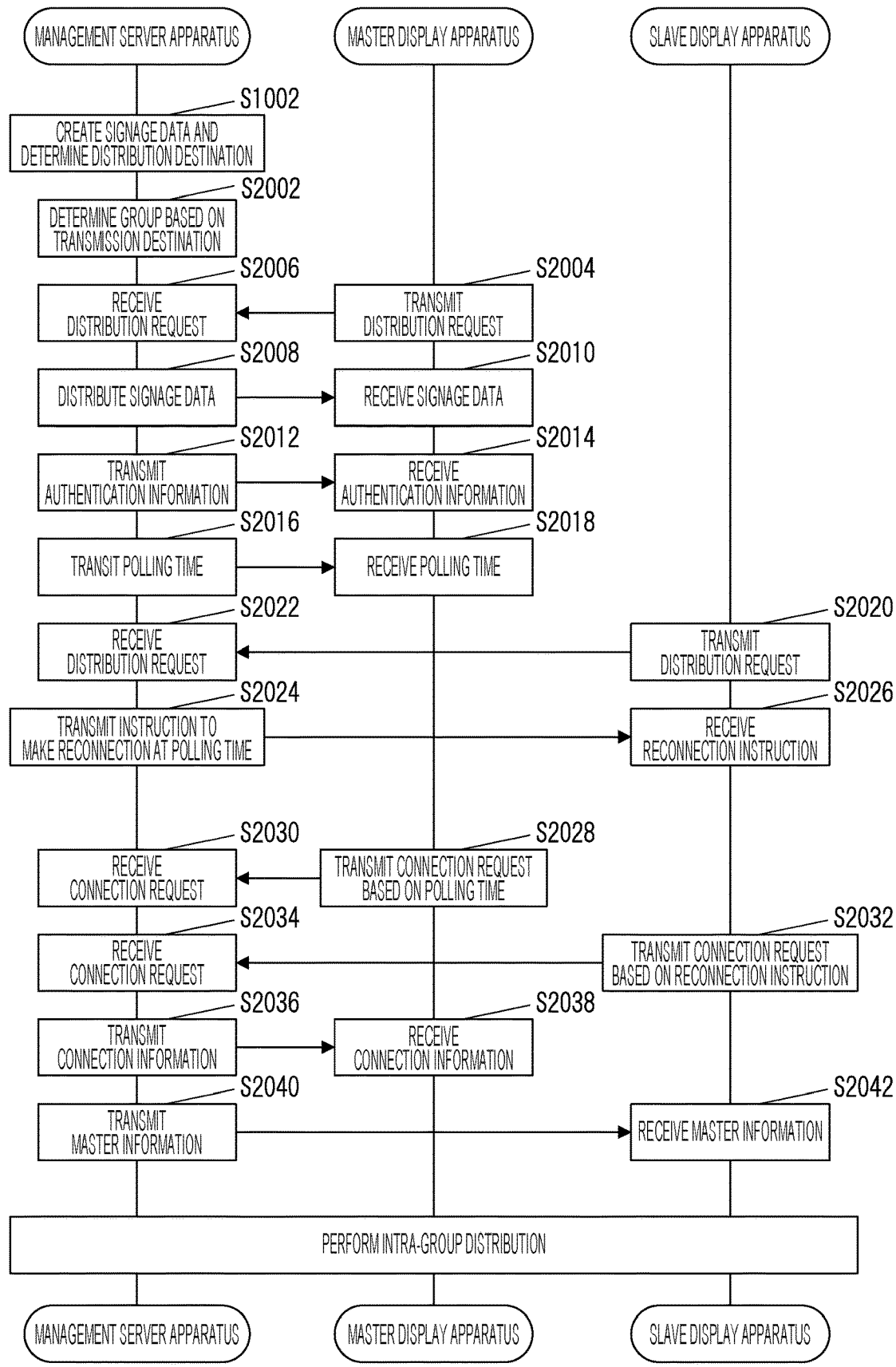
FIG. 21 is a diagram for describing a sequence in the second embodiment.

A flow for the entire flow according to the present embodiment is described with reference to FIG. 21. First, in the management server apparatus 10, the signage data is created, and the distribution destination of the signage data are determined (S1002). Subsequently, based on the determined distribution destination, grouping is performed (S2002). It is noted that a difference with the first embodiment is that at this point, the master display apparatus 22 and the slave display apparatus 24 are not determined.

Subsequently, the management server apparatus 10 transmits the distribution request that is transmitted from the display apparatus 20 (proceeding from S2004 to S2006 takes place). The management server apparatus 10 sets the connected display apparatus 20 to be the master display apparatus 22, and distributes the signage data (S2008). Furthermore, the master display apparatus 22 that receivers the signage data stores the signage data in the signage data storage area 232 (S2010).

Subsequently, the management server apparatus 10 transmits the authentication information on the slave display apparatus 24 to the master display apparatus 22 (S2012). The master display apparatus receives the authentication information and stores the received authentication information as the authentication information 234 (S2014).

Furthermore, in order to cause the master display apparatus 22 to be periodically connected and thus to acquire the connection information, such as the latest IP address, on the master display apparatus 22, the management server apparatus 10 sets up a time interval (the polling time) for making a connection from the master display apparatus 22 to the management server apparatus 10. Furthermore, the polling time that is set up is transmitted to the master display apparatus 22 (S2016). The master display apparatus that has the polling time makes the connection to the management server apparatus 10, based on the polling time (S2018).

Subsequently, in a case where the management server apparatus 10 receives the distribution request that is transmitted from the display apparatus 20 other than the master display apparatus 22 (proceeding from S2020 to S2022 takes place), the display apparatus 20 is set to be the slave display apparatus 24. The instruction to make the reconnection at the polling time for the master display apparatus 22 is transmitted to the slave display apparatus 24.

That is, the master display apparatus 22 makes the connection to the management server apparatus 10 according to the polling time that is set up, and the slave display apparatus 24 makes the reconnection to the management server apparatus 10 at a designated point in time. Therefore, the master display apparatus 22 and the slave display apparatus 24 makes connections to the management server apparatus 10 at a given time.

The master display apparatus 22 transmits the connection request to the management server apparatus 10 based on the polling time, and the management server apparatus 10 receives the connection request (proceeding from S2028 to S2030 takes place). Furthermore, the slave display apparatus 24 transmits the connection request to the management server apparatus 10 based on the reconnection instruction, and the management server apparatus 10 receives the connection request (proceeding from S2032 to S2034 takes place).

The master display apparatus 22 and the slave display apparatus 24 are connected to the management server apparatus 10, and thus the management server apparatus 10 can acquire pieces of connection information on the master display apparatus 22 and the slave display apparatus 24. In order to perform the intra-group distribution processing, the master display apparatus 22 needs to acquire the connection information on the slave display apparatus 24, Because of this, the management server apparatus 10 transmits the connection information on the slave display apparatus 24 within the group to the master display apparatus 22 (S2036). Furthermore, the master display apparatus 22 that receives the connection information stores the received connection information as the connection information 236.

Furthermore, in the same manner, the slave display apparatus 24 needs to acquire the connection information on the master display apparatus 22. Because of this, the management server apparatus 10 transmits the master information to the slave display apparatus 24 (S2040). Furthermore, the slave display apparatus 24 that receives the master information stores the received master information as the master information 344.

Subsequently, the intra-group distribution processing is performed. At this time, the master display apparatus 22 makes the connection to the slave display apparatus 24 based on the authentication information that is received in S2014 and the connection information that is received in S2038, and the slave display apparatus 24 authenticates the master display apparatus 22 based on the master information that is received in S2042.

According to the present embodiment, a duration during which the signage data is distributed can be determined on the display apparatus side. Because of this, flexible content distribution is possible.

Furthermore, when the master display apparatus 22 and the slave display apparatus 24 make the connections to the management server apparatus 10 at the same time, the connection information on each of the master display apparatus 22 and the slave display apparatus 24 is transmitted from the management server apparatus 10. Because of this, even in a case where the IP address of the master display apparatus 22 changes frequently, content distribution is possible.

3. Third Embodiment

Subsequently, a third embodiment is described. The embodiment has the same entire configuration and functional configuration as the second embodiment. Furthermore, as is the case with the second embodiment, the third embodiment employs a PULL type distribution method in which the distribution request from the display apparatus triggers the distribution of the signage data. The present embodiment is different from the second embodiment in that the master display apparatus 22 and the slave display apparatus 24 are not in the state of being connected to the management server apparatus 10 and in that the signage data can be distributed from the master display apparatus 22 to the slave display apparatus 24.

The present embodiment has the same entire configuration and functional configuration as the second embodiment, and thus descriptions thereof are omitted. Furthermore, according to the present embodiment, a flow for processing and a sequence for processing, which are illustrated in FIGS. 17 to 21 in the second embodiment are replaced with a flow for processing and a sequence for processing, respectively, that are illustrated in FIGS. 22 to 25. In figures that illustrate the sequence for processing and the flow for processing, the same processing as in the second embodiment is given the same numeral reference as in the second embodiment, and a description thereof is omitted.

3.1 Flow for Processing by Every Apparatus

3.1.1 Processing by the Management Server Apparatus

Figure 22:
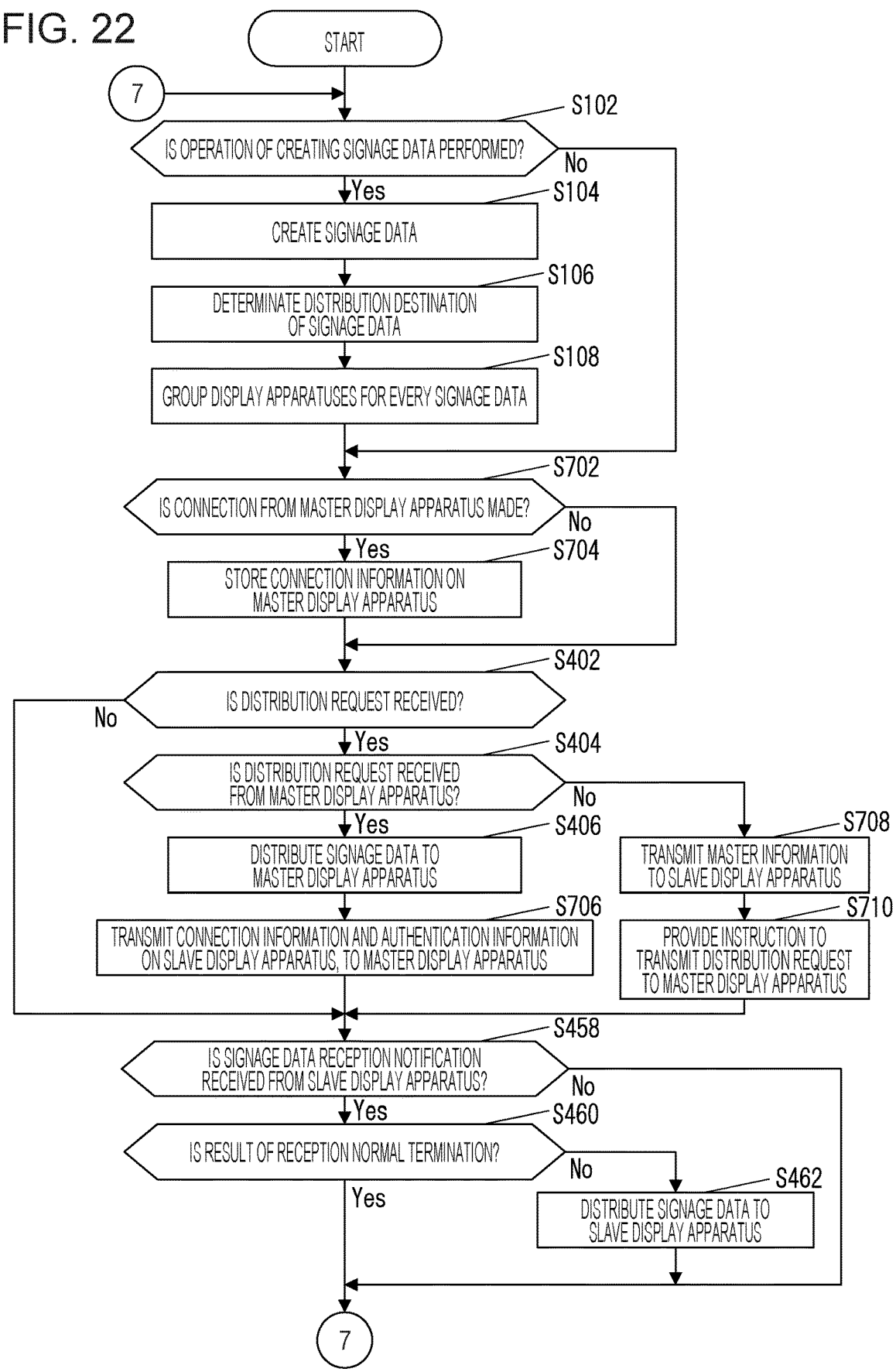
FIG. 22 is a flowchart for describing processing by a management server apparatus in a third embodiment.

Processing by the management server apparatus 10 is described with reference to FIG. 22. First of all, signage data is created and grouping is performed. The processing is the same as in the second embodiment (Step S102 to Step S108).

Subsequently, it is determined whether or not a connection from the master display apparatus 22 to the management server apparatus 10 is made (Step S702). The case where the connection from the master display apparatus 22 to the management server apparatus 10 is made is not only a case where the master display apparatus 22 transmits the distribution request to the management server apparatus 10, but is also a case where, in Step S804 that will be described below, a connection is made to the management server apparatus 10 if the connection information on the master display apparatus 22 is changed.

Furthermore, the determination of whether or not the connection to the master display apparatus 22 is made may be a determination that is made using the same method as in Step S404 according to the second embodiment.

In a case where the master display apparatus 22 is connected, the connection information on the master display apparatus 22 is stored (Step S704). In the present embodiment, as the master information 128, the display apparatus name of the display apparatus, the group ID, the IP address, and the port number are stored.

Subsequently, in a case where the distribution request is received from the display apparatus 20, the management server apparatus 10 determines whether or not the distribution request is received from the master display apparatus 22 (if the result is No in Step S402, proceeding to Step S404 takes place). If the distribution request is received from the master display apparatus 22, the signage data is distributed to the master display apparatus 22 (Step S406), and subsequently, the connection information and the authentication information on the slave display apparatus 24 that belongs to the same group as the master display apparatus 22 (Step S706).

In a case where, in Step S404, the distribution request is received from the slave display apparatus 24 (No in Step S404), the master information is transmitted to the slave display apparatus 24, and an instruction to transmit the distribution request to the master display apparatus 22 is provided (Step S708 to Step S710).

Subsequently, in a case where the result of the reception of the signage data reception notification that is received from the slave display apparatus 24 is not the normal termination, the signage data is distributed to the slave display apparatus 24 (Step S458 to Step S462). Thereafter, returning to Step S102 takes place.

3.1.2 Processing by the Master Display Apparatus

Figure 23:
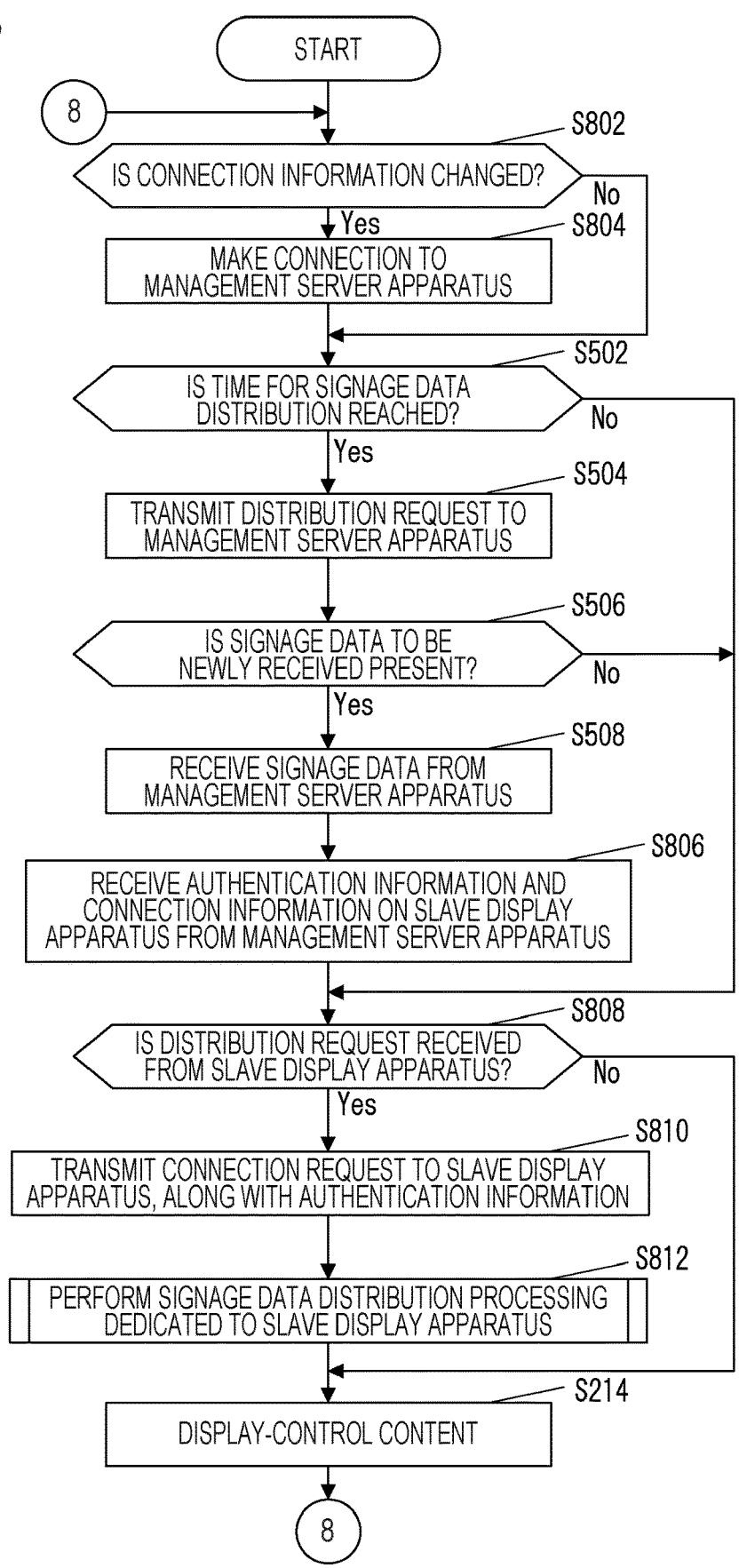
FIG. 23 is a flowchart for describing processing by a master display apparatus in the third embodiment.

Processing by the master display apparatus 22 is described with reference to FIG. 23. First of all, a determination of whether or not the connection information is changed is made, and in a case where the connection information is changed, a connection to the management server apparatus 10 is made (if the result is Yes in Step S802, proceeding to Step S804 takes place). As the case where the connection information is changed, a case is considered where the IP address of the master display apparatus 22 is changed.

Subsequently, it is determined whether or not the time for the signage data distribution request is reached, and if the signage data distribution request is reached, the quality request is transmitted to the management server apparatus (if the result is Yes in Step S502, proceeding to Step S504 takes place). If signage data to be newly received is present, the signage data is received from the management server apparatus 10 (if the result is Yes in Step S506, proceeding to Step S508 takes place). Furthermore, the authentication information and the connection information on the slave display apparatus 24, which are transmitted from, the management server apparatus 10, are received and stored (Step S806).

Subsequently, in a case where the distribution request is received from the slave display apparatus 24, along with the authentication information, the connection request is transmitted to the slave display apparatus 24 that transmits the distribution request (if the result is Yes in Step S808, proceeding to Step S810 takes place). Furthermore, subsequently, the signage data display processing dedicated to the slave display apparatus is performed (Step S812). If the distribution of the signage data to the slave display apparatus 24 that makes the distribution request is completed, the content display control is performed (Step S214).

3.1.3 Processing by the Slave Display Apparatus

Figure 24:
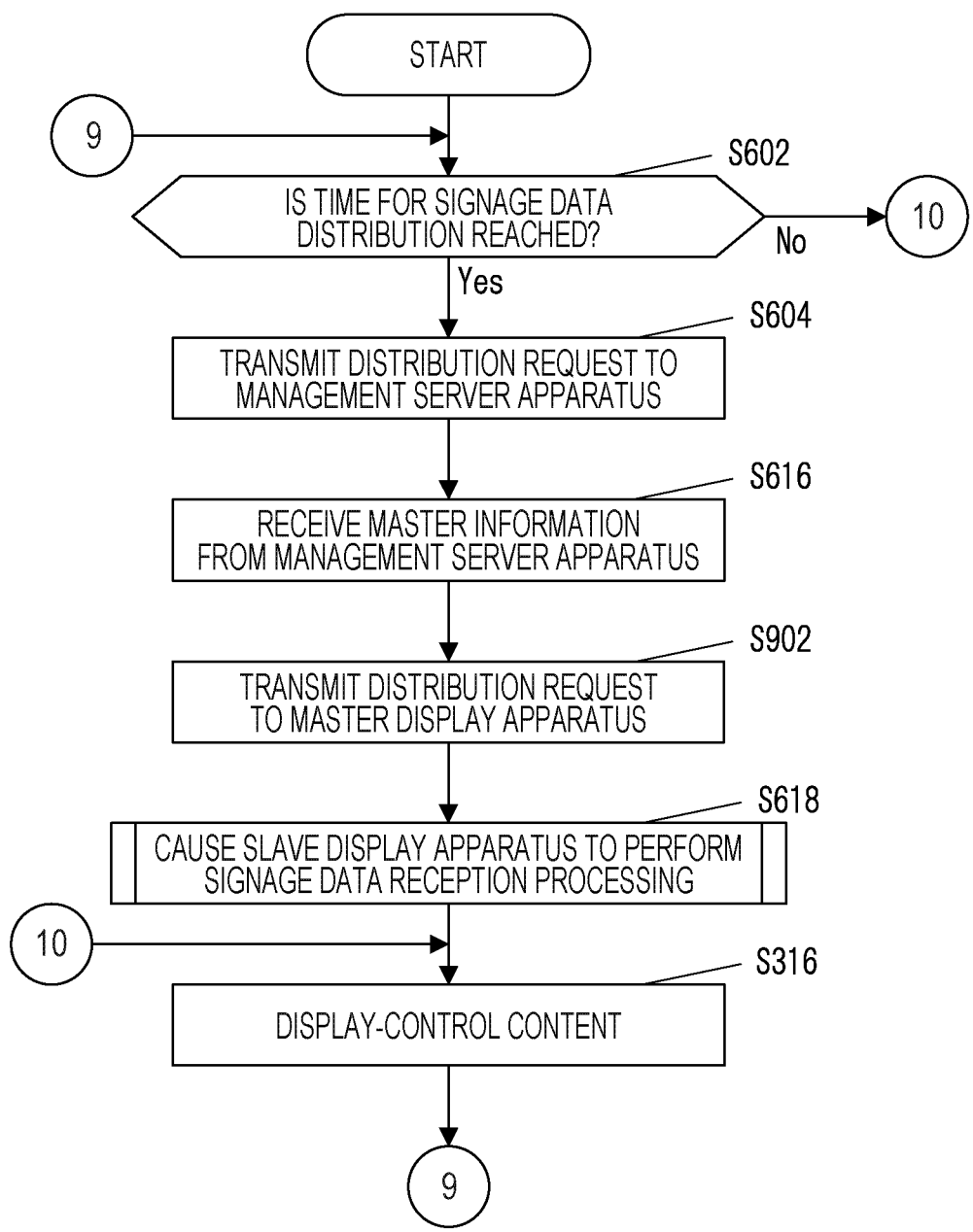
FIG. 24 is a flowchart for describing processing by a slave display apparatus in the third embodiment.

Processing by the slave display apparatus 24 is described with reference to FIG. 24. A difference with the second embodiment is that, if the master information is received from the management server apparatus 10, the distribution request is transmitted to the master display apparatus 22 based on the master information (proceeding from Step S616 to Step S902 takes place). The distribution request triggers the performing of the reception of the signage data is performed (Step S618). If the reception of the signage data is completed, the content is display-controlled (Step S316).

3.2 Flow for the Entire Processing

Figure 25:
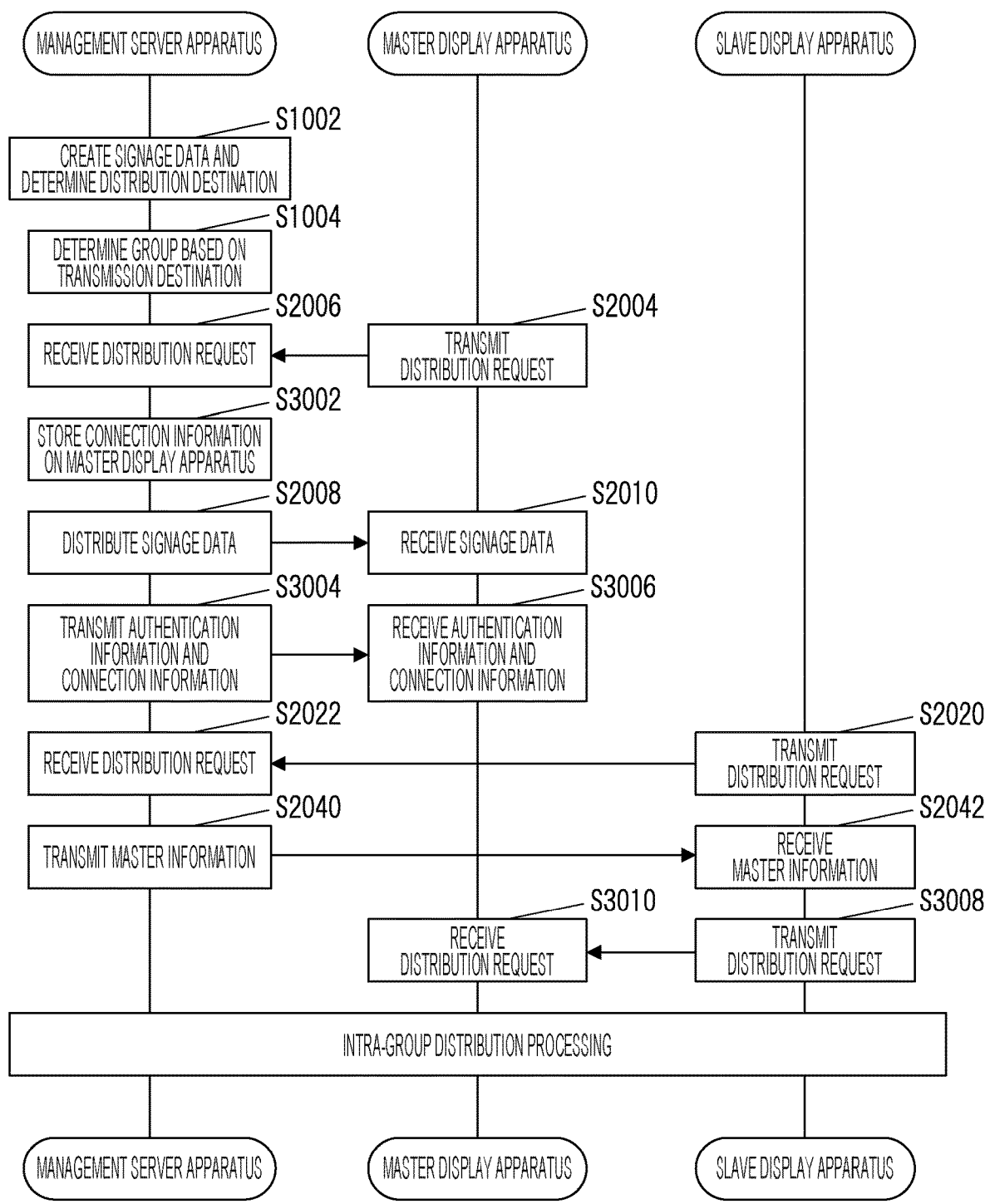
FIG. 25 is a diagram for describing a sequence in the third embodiment.

First of all, a flow for the entire processing in the present embodiment is described with reference to FIG. 25. Processing operations (S1002 to S2006) up to and including a processing operation in which the management server apparatus 10 receives the distribution request from the display apparatus 20 are the same as those in the second embodiment. Subsequently, in a case where the distribution request is received from the master display apparatus 22, the management server apparatus 10 stores the connection information on the master display apparatus 22 (S3002).

Subsequently, the management server apparatus 10 distributes the signage data to the master display apparatus 22, and transmits the authentication information and the connection information on the slave display apparatus 24. Furthermore, the master display apparatus 22 stores the signage data, the authentication information, and the connection information, which are received (proceeding from S2008 to S2010 and proceeding from S3004 to S3006 take place).

Subsequently, if the slave display apparatus 24 transmits the distribution request to the management server apparatus 10 (S2020), the management server apparatus receives the distribution request and transmits the master information to the slave display apparatus 24 that transmits the distribution request (proceeding from S2022 to S2040 takes place). Furthermore, the display apparatus that receives the master information stores the master information as the master information 344 (S2042).

Subsequently, based on the master information 344, the slave display apparatus 24 transmits the distribution request to the master display apparatus 22 (S3008). The master display apparatus 22 receives the distribution request (S3010). In a case where the slave display apparatus 24 that is equivalent to the connection information is present, the master display apparatus 22 performs the intra-group distribution processing to the slave display apparatus 24. With the processing described above, the signage data can be distributed to the master display apparatus 22 and the slave display apparatus 24.

According to the embodiment described above, the duration during which the signage data is distributed can be determined on the display apparatus 20 side. Because of this, flexible content distribution is possible.

Furthermore, there is no need for the master display apparatus 22 and the slave display apparatus 24 to make connections to the management server apparatus 10 at the same time. Because of this, load on the management server apparatus 10 is decreased, and the distribution to the slave display apparatus 24 is also possible without making a reconnection. The present embodiment is effective in an environment where the IP address is not frequently changed.

4. Fourth Embodiment

Subsequently, a fourth embodiment is described. The fourth embodiment and the first embodiment are the same in the entire configuration and functional configurations of the master display apparatus 22 and the slave display apparatus 24, but are different in that the display apparatuses 20 are grouped in advance and signage data that is to be distributed is distributed to a group of the display apparatuses 20. It is noted that a configuration and processing that are the same as those in the first embodiment are given the same reference numbers that are in the figures in the first embodiment and thus that descriptions thereof are omitted.

Figures 26, 27:
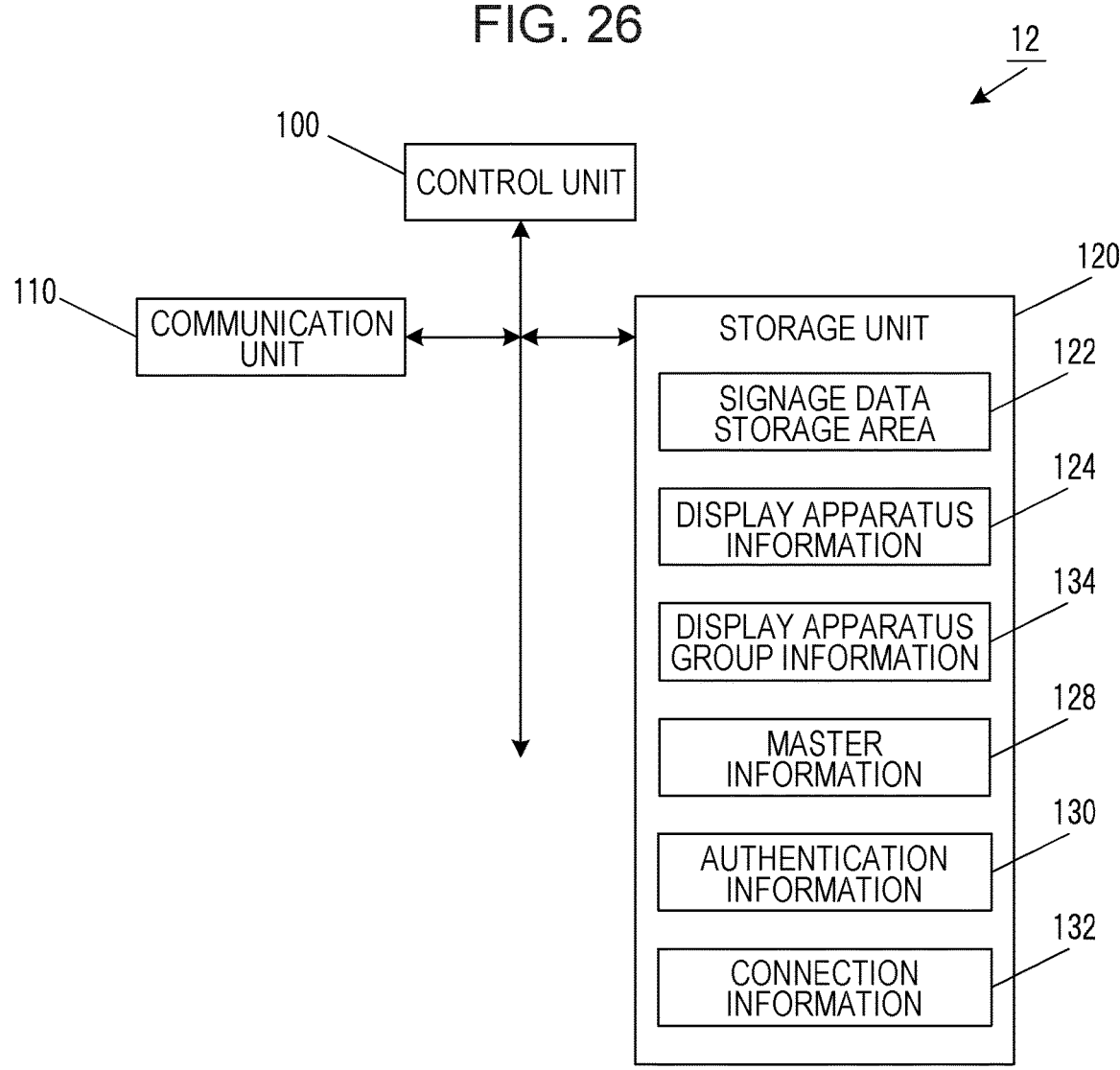
FIG. 26 is a diagram for describing a functional configuration of a management server apparatus in a fourth embodiment.
FIG. 27 is a diagram for describing a data structure of display apparatus group information in the fourth embodiment.

A functional configuration of a management server apparatus 12 in the present embodiment is illustrated in FIG. 26. The present embodiment is different from the first embodiment in that, instead of the grouping information 126, display apparatus group information 134, in which a configuration of the display apparatus 20 and information relating to signage data that is to be distributed are stored, is stored.

The display apparatus group information 134 is described with reference to FIG. 27. Stored in the display apparatus group information 134 are a display apparatus group name (for example, "in-front-of-entrance-hall group") for identifying a group of the display apparatuses 20, a display apparatus name (for example, "SCREEN0001, SCREEN0002") of the display apparatus that belongs to the group, and signage data (for example, "data_entrance"). Furthermore, a group that results from grouping the display apparatuses 20 refers to a display apparatus group.

Figure 28:
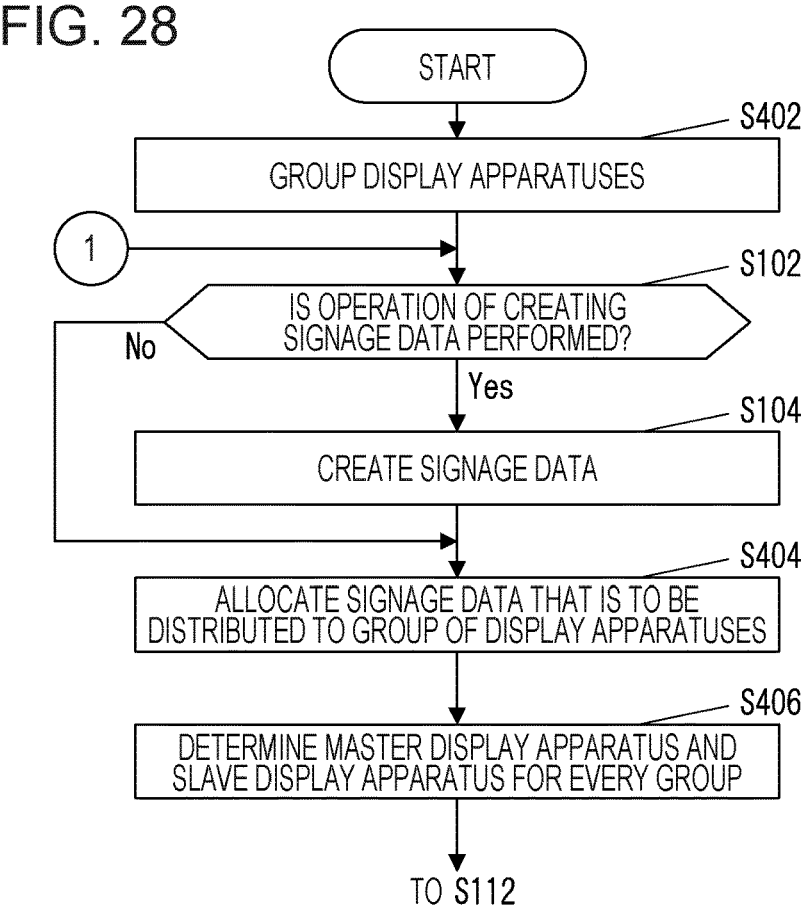
FIG. 28 is a flowchart for describing processing by the management server apparatus in the fourth embodiment.

Subsequently, a flow for the management server apparatus 12 according to the present embodiment is described with reference to FIG. 28. In a flow in the management server apparatus 12 according to the present embodiment, Step S102 to Step S110 in FIGS. 9 to 10 that illustrate the flow in the management server apparatus 10 according to the first embodiment are replaced with S402 to S406 in FIG. 27.

First of all, the grouping of the display apparatuses 20 is performed (Step S402). Specifically, from the perspective of an installation place, or from the intended use or the performance of the apparatus, the manager of the digital signage system 1, or the like groups the display apparatuses 20, and determines the display apparatus group name of the display apparatus group. At this time, the management server apparatus 12 stores the display apparatus group name and the display apparatus name of the display apparatus that belongs to the display apparatus group, in the display apparatus group information 134, for every display apparatus group.

Subsequently, in a case where an operation of creating the signage data is performed, the signage data is created (if the result is Yes in Step S102, proceeding to Step S104 takes place). Subsequently, the signage data that is to be distributed is allocated to the display apparatus (Step S404). Specifically, the signage data that to be distributed is stored in the display apparatus group information 134, for every display apparatus group.

Subsequently, the master display apparatus 22 and the slave display apparatus 24 are determined for every display apparatus group (Step S406). That is, among the display apparatuses 20 that belong to the display apparatus group, one or more display apparatuses 20 are set to be the master display apparatuses 22, and the other display apparatuses 20 are set to be the display apparatuses 24. A method of determining the master display apparatus 22 and the slave display apparatus 24 may be determined using the same method as in Step S110. Furthermore, among the display apparatuses 20 that belong to the display apparatus group, a specific display apparatus 20 may be set up in such a manner as to be the master display apparatus 22.

Figure 29:
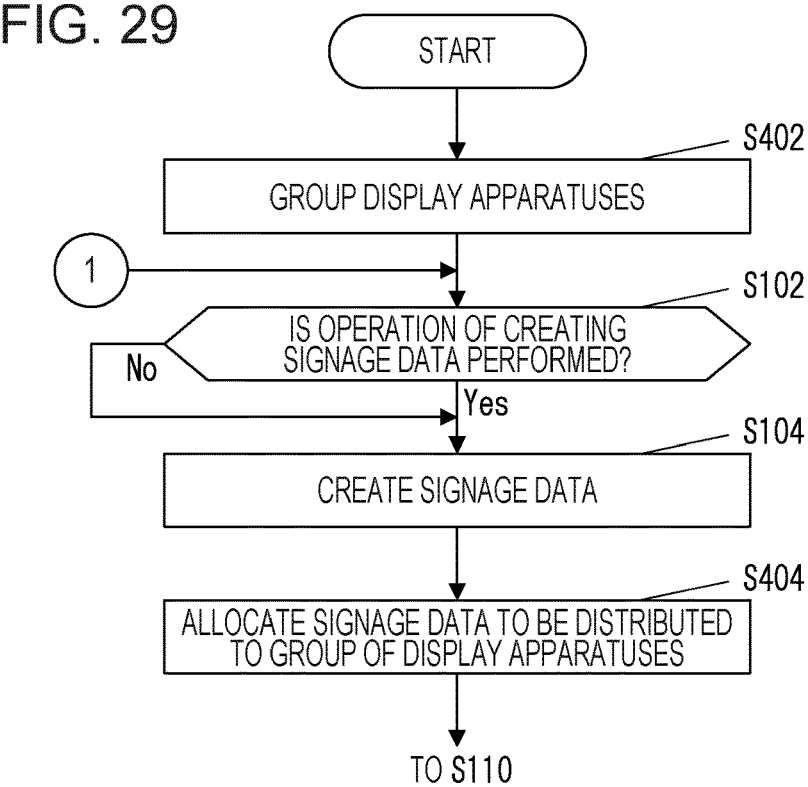
FIG. 29 is a flowchart for describing the processing by the management server apparatus in the fourth embodiment.

It is noted that in the second embodiment and the third embodiment, in a case where the same processing as in the present processing is performed, the processing operations in S102 to S108 can be realized by being replaced with processing operations in S402 to S404 that are illustrated in FIG. 29.

According to the present embodiment, it is possible that the group of the display apparatuses 20 is determined in advance, and then that the signage data to be distributed is created and distributed. Therefore, it is possible that the signage data is created or distributed taking into consideration a place where the display apparatus 20 installed and a method of operationally managing the display apparatus 20. Furthermore, in a case where a method of operational management of the digital signage system 1 is determined, it is considered that an embodiment which is easy to manage operationally is available.

5. Fifth Embodiment

Subsequently, a fifth embodiment is described. The fifth embodiment and the first embodiment are the same in the entire configuration and the functional configuration as the first embodiment, but are different in that the display apparatus 20 is caused to belong to two or more groups. It is noted that a configuration and processing that are the same as those in the first embodiment are given the same reference numbers that are in the figures in the first embodiment and thus that descriptions thereof are omitted.

The present embodiment is an embodiment in which, in Step S106, one display apparatus 20 is possibly designated as distribution destinations of one piece of or two or more pieces of signage data that are represented by one display apparatus 20. For example, signage data for "summer sale" and signage data for "time sale" can be designated as being distributed to the same display apparatus 20. In this case, the signage data for "summer sale" and the signage data for "time sale" are displayed on the display apparatus 20.

Figure 30B:
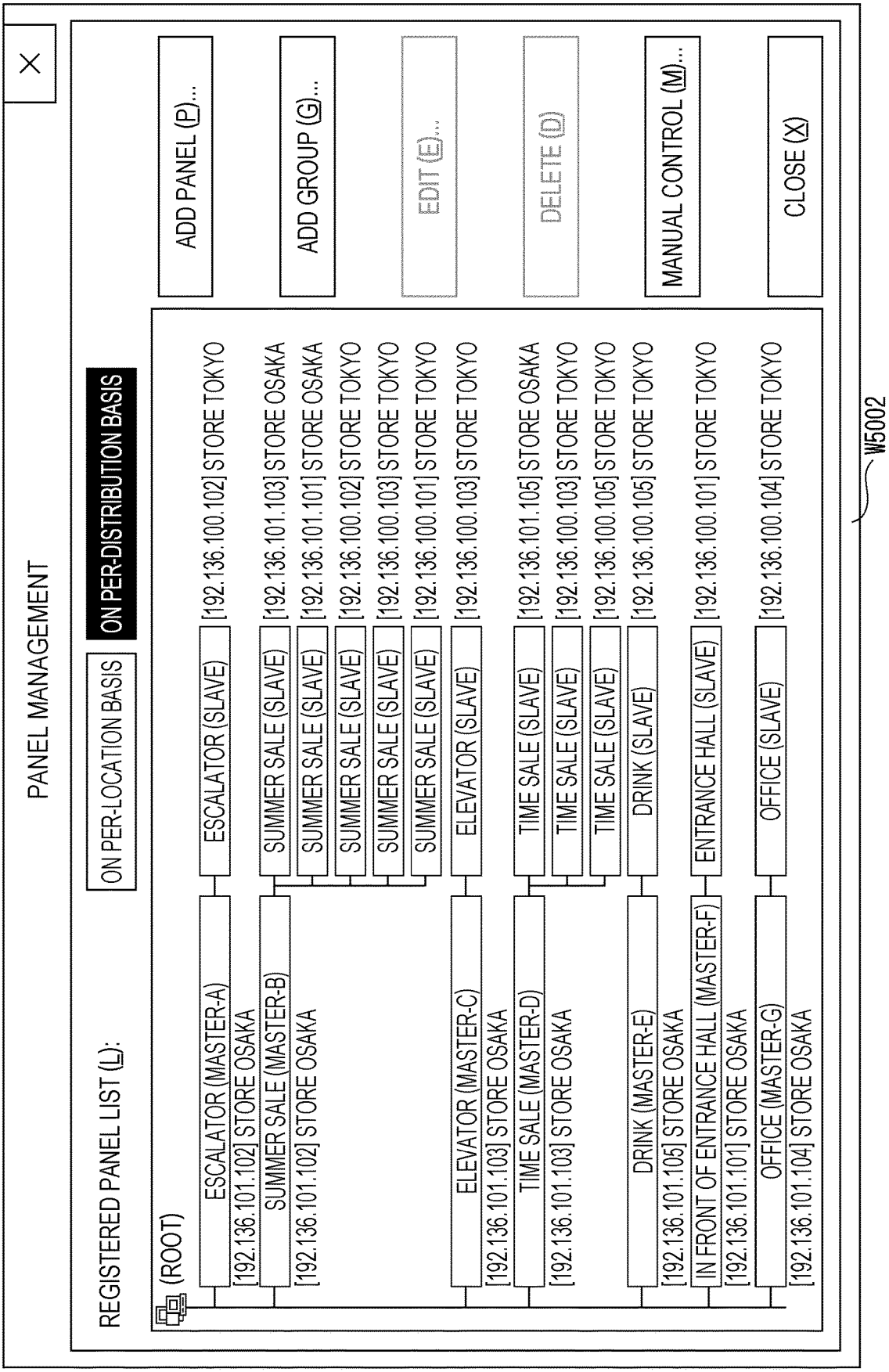

An example of screen display on the management server apparatus 10 in the present embodiment is described with reference to FIGS. 30A and 30B. FIGS. 30A and 30B illustrate an example of the screen display, in which the state where display apparatuses 20 that are managed by the management server apparatus 10 are grouped are displayed on a display or the like which is connected to the management server apparatus 10.

FIG. 30A is a diagram of a display screen W5000 on which the display apparatuses 20 are displayed on a per-location basis. Specifically, it is illustrated that any one of "STORE OSAKA" and "STORE TOKYO" as locations is assigned, as location attributes, to the display apparatus 20 that is managed by the management server apparatus 10. Furthermore, it is illustrated that there are five display apparatuses, of which location attributes are "STORE OSAKA" and that the display apparatus names are "ESCALATOR", "ELEVATOR HALL", and the like.

At this point, it is illustrated that the displays 20 that are illustrated on T5000 in FIG. 30A belong to two groups, a group of which the group name is "ESCALATOR" and a group of which the group name is "SUMMER SALE". Furthermore, the display apparatuses are the master display apparatus 22 in the group of which the group name is "ESCALATOR", and the master display apparatus 22 in the group of which the group name is "SUMMER SALE".

Furthermore, FIG. 30B is a diagram of a display screen W5002 on which the display apparatuses 20 are displayed on a per-distribution basis, and illustrates a relationship between the master display apparatus 22 and the slave display apparatus 24 for every group. Display content is the same as that in FIG. 16B in the first embodiment.

Furthermore, in the same manner as in the first embodiment, a distribution situation of the signage data may be displayed, for identification, on the display screen W5000 and the display screen W5002.

According to the embodiment described above, the display apparatus 20 is caused to belong two or more groups, and thus the display apparatus 20 can receive the signage data that is distributed the group to which the display apparatus 20 belongs. Therefore, even in a case where one portion of the signage data that is distributed to two or more display apparatuses 20 is shared, a group is configured for every shared signage data, and thus efficient distribution of the signage data is possible.

6. Modification Example

The embodiments of the present technology are described above in detail referring to the drawings, but the specific constitutions are not limited to the embodiments, and a design and the like within a scope that does not depart from the gist of the present technology fall within the scope of claims as well.

Furthermore, according to the embodiments described above, of course, the embodiments can be implemented in combination. For example, a system in which a push type distribution and a pull type distribution are present in a mixed manner may be built up by combining the first embodiment and the second embodiment. For example, the push type distribution may be employed for the display apparatus 20 that is deployed in an environment where a wired LAN is used, and the pull type distribution may be employed for the display apparatus 20 that is connected to an access point on a wireless LAN due to a situation where the wired LAN is used.

Furthermore, a program running on each of the apparatus in each embodiment is a program (a program that causes a computer to operate) that controls a CPU and the like in such a manner as to realize the functions according to each of the embodiments described above. Then, pieces of information that are handled in each of the apparatus are temporarily accumulated in a temporary storage device (for example, a RAM) while being processed. Thereafter, the pieces of information are stored in various storage devices, that is, HDDs or solid state drives (SSDs), and if need arises, is read by the CPU in order to be modified or written.

Furthermore, in a case where the programs are distributed on the market, each of which is stored on a portable recording medium, can be distributed, or can be transferred to a server computer that is connected through a network, such as the Internet. In this case, of course, a storage device of the server computer falls within the scope of the present technology as well.

The present disclosure contains subject matter related to that disclosed in Japanese Priority Patent Application JP 2017-214240 filed in the Japan Patent Office on Nov. 6, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content distribution system in which content is distributed from a content distribution apparatus to a plurality of display apparatuses, wherein the content distribution apparatus includes:
   a processor;
   a memory; and
   a storage unit in which the content is stored,
   wherein the memory stores instructions that cause the processor to:
   acquire information on a connection request source as connection information on one of the plurality of display apparatuses, when a connection request from each of the plurality of display apparatuses is present,
   group display apparatuses to which the same content is to be distributed among the plurality of display apparatuses, into one group,
   manage one of the plurality of display apparatuses, which belongs to the group, as a master display apparatus and the other of the plurality of display apparatuses, which belongs to the group, as slave display apparatuses, and
   transmit the content and the connection information on the slave display apparatuses, to the master display apparatus,
   wherein the master display apparatus includes a content distribution control unit which makes a connection to the slave display apparatuses based on the received connection information and distributes the content,
   wherein a display schedule in each of the plurality of display apparatuses, and one content item or a plurality of content items that are to be displayed on each of the plurality of display apparatuses are stored in the memory, as pieces of signage data,
   wherein the plurality of display apparatuses is grouped according to the same signage data and is to be distributed into one group,
   wherein the signage data and the connection information on the slave display apparatuses that belongs to the group are both transmitted to the master display apparatus, and
   wherein a connection is made to the slave display apparatuses to distribute the signage data,
   wherein the slave display apparatuses determine whether an IP address and a port number of one of the plurality of display apparatuses, that is a connection source, are matched with the IP address and the port number, respectively, of the master display apparatus, which are transmitted from a management server apparatus, and if the one of the plurality of display apparatuses is regarded as the master display apparatus, a connection is made to the one of the plurality of display apparatuses.

2. The content distribution system according to claim 1, wherein authentication information on the slave display apparatuses is additionally stored in the storage unit,
wherein the authentication information is additionally transmitted, and
wherein the content distribution control unit logs in to the slave display apparatuses using the authentication information, and distributes the content.

3. The content distribution system according to claim 1, wherein the connection information is acquired from the master display apparatus and,
when the master display apparatus is in a connected state, acquires the connection information from the slave display apparatuses.

4. The content distribution system according to claim 3, wherein, when a connection from the slave display apparatuses is detected, a request is made to the slave display apparatuses for reconnection at a timing at which the master display apparatus is in the connected state, in a case where the master display apparatus has difficulty in detecting the connected state.

5. The content distribution system according to claim 1, wherein one master display apparatus or a plurality of master display apparatuses is managed, from one of the plurality of display apparatuses that belongs to the group.

6. The content distribution system according to claim 1, wherein, in a case where the reception of the content from the master display apparatus fails, the slave display apparatuses requests the content distribution apparatus to distribute the content.

7. The content distribution system according to claim 1, wherein the connection information is an IP address and a port number.

8. A content distribution system in which content is distributed from a content distribution apparatus to a plurality of display apparatuses, wherein the content distribution apparatus includes:
a processor;
a memory; and
a storage unit in which the content is stored,
wherein the memory stores instructions that cause the processor to:
acquire information on a connection request source, as connection information on one of the plurality of display apparatuses, when a connection request from each of the plurality of display apparatuses is present,
group display apparatuses to which the same content is to be distributed among the plurality of display apparatuses, into one group,
perform management to set one of the plurality of display apparatuses, which belongs to the group, to be a master display apparatus, and to set the other of the plurality of display apparatuses to be slave display apparatuses,
transmit the content to the master display apparatus, and
transmit the connection information on the master display apparatus to the slave display apparatuses,
wherein the master display apparatus includes a content distribution control unit that makes a connection to the slave display apparatuses and distributes the content in a case where a request for content distribution from the slave display apparatuses is received,
wherein a display schedule in each of the plurality of display apparatuses, and one content item or a plurality of content items that are to be displayed on each of the plurality of display apparatuses are stored in the storage unit, as pieces of signage data,
wherein the plurality of display apparatuses are grouped according to the same signage data is to be distributed, into one group,
wherein the signage data is transmitted to the master display apparatus, and
wherein the content distribution control unit makes a connection to the slave display apparatuses and distributes the signage data,
wherein the slave display apparatuses determine whether an IP address and a port number of one of the plurality of display apparatuses, that is a connection source, are matched with the IP address and the port number, respectively, of the master display apparatus, which are transmitted from a management server apparatus, and
if the one of the plurality of display apparatuses is regarded as the master display apparatus, a connection is made to the one of the plurality of display apparatuses.

9. The content distribution system according to claim 8, wherein authentication information on the slave display apparatuses is additionally stored in the storage unit,
wherein the authentication information is additionally transmitted, and
wherein the content distribution control unit logs in to the slave display apparatuses using the authentication information, and distributes the content.

10. The content distribution system according to claim 8, wherein one master display apparatus or a plurality of master display apparatuses is managed, from one of the plurality of display apparatuses that belongs to the group.

11. The content distribution system according to claim 8, wherein the connection information is an IP address and a port number.

* * * * *